United States Patent [19]
Ichinohe et al.

[11] Patent Number: 6,032,266
[45] Date of Patent: Feb. 29, 2000

[54] NETWORK SYSTEM HAVING FUNCTION OF CHANGING ROUTE UPON FAILURE

[75] Inventors: Shinya Ichinohe; Norihide Noyama, both of Hadano; Tokuhiro Niwa, Ebina; Masao Nakamura, Hadano, all of Japan

[73] Assignees: Hitachi, Ltd.; Hitachi Microcomputer System, Ltd., both of Tokyo, Japan

[21] Appl. No.: 08/832,270

[22] Filed: Apr. 3, 1997

[30] Foreign Application Priority Data

Apr. 5, 1996 [JP] Japan .................................. 8-083653
May 29, 1996 [JP] Japan .................................. 8-134690

[51] Int. Cl.$^7$ .................................................. G06F 11/00
[52] U.S. Cl. ............................... 714/9; 714/21; 714/43; 714/47; 714/48
[58] Field of Search ................ 395/182.02, 182.05, 395/182.07, 182.19, 183.01, 185.01, 184.01, 183.19; 714/4, 7, 9, 21, 25, 43, 47, 48

[56] References Cited

U.S. PATENT DOCUMENTS

| | | | |
|---|---|---|---|
| 5,220,663 | 6/1993 | Bauchot et al. | 395/575 |
| 5,435,003 | 7/1995 | Chung et al. | 395/575 |
| 5,473,599 | 12/1995 | Li et al. | 370/16 |
| 5,513,345 | 4/1996 | Sato et al. | 395/182.02 |
| 5,530,806 | 6/1996 | Condon et al. | 395/185.02 |
| 5,600,791 | 2/1997 | Carlson et al. | 395/184.01 |
| 5,675,723 | 10/1997 | Ekrot et al. | 395/182.02 |
| 5,781,715 | 7/1998 | Sheu | 395/182.02 |
| 5,781,716 | 7/1998 | Hemphill et al. | 395/182.02 |
| 5,796,934 | 8/1998 | Bhanot et al. | 395/182.02 |
| 5,844,903 | 12/1998 | Terashita et al. | 370/403 |

FOREIGN PATENT DOCUMENTS 6-131208  5/1994  Japan .

*Primary Examiner*—Norman Michael Wright
*Attorney, Agent, or Firm*—Fay, Sharpe, Beall, Fagan, Minnich & McKee

[57] ABSTRACT

A network system includes a plurality of networks, a first internetwork apparatus having a plurality of first ports each connected to the plurality of networks, a second internetwork apparatus having a plurality of second ports each connected to the plurality of networks, and a data transmission path connected to the first and second internetwork apparatuses to transmit data mutually between the first and second internetwork apparatuses. In the normal state, each of the plurality of first ports is caused to be able to transmit and receive data to and from one of the plurality of networks and the plurality of second ports are caused not to be able to receive data from the plurality of networks and to be able to transmit data to the plurality of networks. Whether a failure occurs in any of one of the plurality of first ports and a route between one of the plurality of first ports and one of the plurality of networks connected thereto is detected and the one of the plurality of first ports is caused not to be able to transmit and receive data to and from the one of the plurality of networks in response to detection of occurrence of failure. One of the plurality of second ports connected to the one of the plurality of first ports through the one of said plurality of networks is caused to be able to transmit and receive data to and from the one of the plurality of networks in response to detection of occurrent of failure.

16 Claims, 21 Drawing Sheets

FIG.2A

| PORT NUMBER | INHERENT IP ADDRESS | INHERENT MAC ADDRESS | COMMON IP ADDRESS | COMMON MAC ADDRESS | 1 |
|---|---|---|---|---|---|
| \multicolumn{6}{c}{1} | |
| A | a | a' | x | x' | 1 |
| C | c | c' | y | y' | 1 |
| -- | | | | | |

| PORT NUMBER | INHERENT IP ADDRESS | INHERENT MAC ADDRESS | COMMON IP ADDRESS | COMMON MAC ADDRESS | 0 |
|---|---|---|---|---|---|
| B | b | b' | x | x' | 0 |
| D | d | d' | y | y' | 0 |
| -- | | | | | |

| DESTINATION | NEXT HOP |
|---|---|
| NETWORK N | x |
| NETWORK M | y |
| NETWORK L | e |

| DESTINATION | NEXT HOP |
|---|---|
| NETWORK N | b |
| NETWORK M | d |
| NETWORK L | f |

| DESTINATION | NEXT HOP |
|---|---|
| NETWORK N | e |
| NETWORK M | y |
| NETWORK L | e |

| DESTINATION | NEXT HOP |
|---|---|
| NETWORK N | x |
| NETWORK M | d |
| NETWORK L | f |

| DESTINATION | NEXT HOP |
|---|---|
| NETWORK N | x |
| NETWORK M | e |
| NETWORK L | e |

| DESTINATION | NEXT HOP |
|---|---|
| NETWORK N | b |
| NETWORK M | y |
| NETWORK L | f |

FIG.10A

| DESTINATION | NEXT HOP |
|---|---|
| NETWORK N | e |
| NETWORK M | e |
| NETWORK L | e |

FIG.10B

| DESTINATION | NEXT HOP |
|---|---|
| NETWORK N | x |
| NETWORK M | y |
| NETWORK L | f |

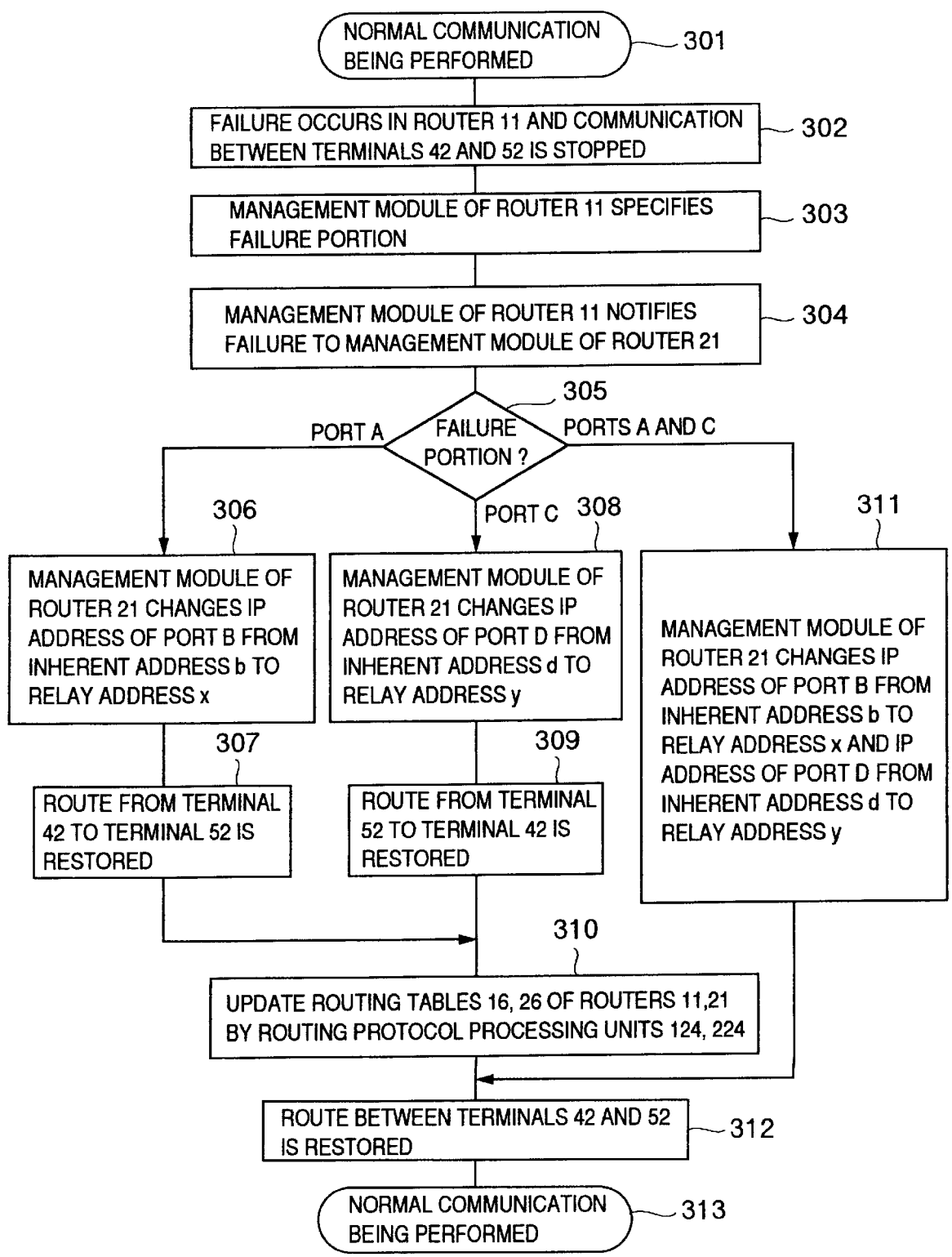

FIG.13A

| DESTINATION | NEXT HOP |
|---|---|
| NETWORK N | e |
| NETWORK M | y |
| NETWORK L | e |

FIG.13B

| DESTINATION | NEXT HOP |
|---|---|
| NETWORK N | x |
| NETWORK M | f |
| NETWORK L | f |

| DESTINATION | NEXT HOP |
|---|---|
| NETWORK N1 | x1 |
| NETWORK N2 | x2 |
| NETWORK N3 | x3 |
| NETWORK M1 | y1 |
| NETWORK M2 | y2 |
| NETWORK M3 | y3 |
| NETWORK L | e |

| DESTINATION | NEXT HOP |
|---|---|
| NETWORK N1 | b1 |
| NETWORK N2 | b2 |
| NETWORK N3 | b3 |
| NETWORK M1 | d1 |
| NETWORK M2 | d2 |
| NETWORK M3 | d3 |
| NETWORK L | f |

| DESTINATION | NEXT HOP |
|---|---|
| NETWORK N1 | e |
| NETWORK N2 | e |
| NETWORK N3 | e |
| NETWORK M1 | y1 |
| NETWORK M2 | y2 |
| NETWORK M3 | y3 |
| NETWORK L | e |

| DESTINATION | NEXT HOP |
|---|---|
| NETWORK N1 | x1 |
| NETWORK N2 | x2 |
| NETWORK N3 | x3 |
| NETWORK M1 | d1 |
| NETWORK M2 | d2 |
| NETWORK M3 | d3 |
| NETWORK L | f |

FIG.17A

| DESTINATION | NEXT HOP |
|---|---|
| NETWORK N1 | e |
| NETWORK N2 | x2 |
| NETWORK N3 | x3 |
| NETWORK M1 | y1 |
| NETWORK M2 | y2 |
| NETWORK M3 | y3 |
| NETWORK L | e |

| DESTINATION | NEXT HOP |
|---|---|
| NETWORK N1 | x1 |
| NETWORK N2 | b1 |
| NETWORK N3 | b2 |
| NETWORK M1 | d1 |
| NETWORK M2 | d2 |
| NETWORK M3 | d3 |
| NETWORK L | f |

26

NETWORK SYSTEM HAVING FUNCTION OF CHANGING ROUTE UPON FAILURE

BACKGROUND OF THE INVENTION

The present invention relates to a network system in which a plurality of internetwork apparatuses such as routers each connecting networks at the network layer level are used to connect a plurality of networks to one another, and more particularly to a network system having the redundant configuration in which a current internetwork apparatus is changed to a standby internetwork apparatus upon failure of the current internetwork apparatus.

In the system in which a plurality of networks are connected by a single router, when a failure occurs in the router, operation of the whole of the system is stopped, so that the whole of the system fails to be operated normally. On the other hand, there is a system having the redundant configuration using two routers one serving as a current router and the other serving as a standby router and in which in the normal state of the current router the system is operated by the current router and when a failure occurs in the current router the system is operated by the standby router instead of the current router to thereby attain a high reliability system.

Such a system having the redundant configuration is disclosed in, for example, JP-A-6-131208. In this system, when a failure occurs in a current network apparatus, operation of the whole of the current network apparatus is stopped and the current network apparatus is changed to a standby network apparatus to thereby realize the system having the redundant configuration.

Further, in a network system, various management information such as statistical information, set information and the like is exchanged among nodes in the network and is managed as a management information base (MIB).

SUMMARY OF THE INVENTION

In the system having the redundant configuration in the prior art, when a failure occurs in a port of the current network apparatus or in a connection portion between the port and the network, operation of the whole of the current apparatus is stopped. That is, operation of not only the port in which the failure occurs but also other all normal ports in the current network apparatus is stopped and operation is changed from the current network apparatus to the standby network apparatus. Accordingly, even in communication between the networks connected to the normal ports of the current network apparatus, it is necessary to disconnect the normal ports and to change the communication routes to the standby network apparatus.

Further, in this case, when data is transmitted from a terminal of the network, the relay port of the data is changed and accordingly an address thereof must be also changed.

In addition, even in transmission and reception of management information managed by using management information base (MIB), it is necessary to transmit and receive the management information in consideration of the physical configuration of the network apparatus in response to change of the route.

More particularly, in the system for managing networks on the basis of MIB information, that is, information based on the management information base (MIB) for each network, when a failure occurs in a certain port of a current apparatus, operation of the current apparatus is stopped completely and is changed from the current apparatus to the standby apparatus. Accordingly, MIB information of all ports (that is, all networks) of the current apparatus cannot be obtained. Thus, management of the networks cannot be performed on the basis of the MIB information available before occurrence of the failure.

It is an object of the present invention to provide a network system and a failure restoration method of the network system which is adapted to be solve the drawbacks in the prior art.

It is another object of the present invention to provide a network system and a failure restoration method of the network system in which when a failure occurs in a port of a current apparatus, data communication can be made without change of other normal ports of the current apparatus.

It is a further object of the present invention to provide a network system and a failure restoration method of the network system in which even a terminal having no dynamic routing function and address resolution protocol (ARP) function for conversion of address, that is, having only the routing function can make communication without considering change of a route due to occurrence of a failure.

It is another object of the present invention to provide a network system capable of collecting management information base (MIB) information without considering change of a route due to occurrence of a failure.

In order to achieve the above objects, according to an aspect of the present invention, there is provided a network system which includes a plurality of networks, a first internetwork apparatus including a plurality of first ports each connected to the plurality of networks, a second internetwork apparatus including a plurality of second ports each connected to the plurality of networks, and a data transmission unit connected to the first and second internetwork apparatuses to transmit data mutually between the first and second internetwork apparatuses, wherein the first internetwork apparatus includes a first transmitting and receiving unit connected to the plurality of first ports and the data transmission to transmit and receive data mutually among the plurality of first ports and the data transmission unit, a failure detection unit for detecting whether a failure occurs in any of one of the plurality of first ports and a route between one of the plurality of first ports and one of the plurality of networks connected thereto and, when occurrence of a failure is detected, issuing notification indicating a failure occurrence portion to transmit the notification through the first transmitting and receiving unit to the data transmission unit, and a first port control unit for causing each of the plurality of first ports to be able to transmit and receive data to and from the one of the plurality of networks in a normal state and causing the one of the plurality of first ports not to be able to transmit and receive data to and from the one of the plurality of networks in response to detection of occurrence of failure by the failure detection unit, and the second internetwork apparatus includes a second transmitting and receiving unit connected to the plurality of second ports and the data transmission unit for transmitting and receiving data mutually among the plurality of second ports and the data transmission unit and for receiving the notification transmitted through the data transmission unit to produce the notification, and a second port control unit for causing the plurality of second ports not to be able to receive data from the plurality of networks and to be able to transmit data to the plurality of networks in the normal state and responsive to the notification from the second transmitting and receiving unit to cause one of the plurality of second ports connected through the one of the plurality of networks to the one of the plurality of first ports to be able to transmit and receive data to and from the one of the plurality of networks.

According to one example of the present invention, the first port control unit sets an address of each of the plurality of first ports to a common address common to the port and a corresponding one of the plurality of second ports connected through a corresponding one of the plurality of networks in the normal state, the common address being different for each of the plurality of first ports, and the second port control unit sets an address of each of the plurality of second ports to an address inherent to the port in the normal state.

According to one example of the present invention, the first port control unit includes a unit for disconnecting the one of the plurality of first ports from the one of the plurality of networks in response to detection of occurrent of failure by the failure detection unit, and the second port control unit changes an address of the one of the plurality of second ports from the inherent address to the common address set in the one of the plurality of first ports in response to the notification from the second transmitting and receiving unit.

As described above, even if a failure occurs in any portion of a port in the current internetwork apparatus (router), the routing module including the port and a route between the port and the pertinent networks, only the port corresponding to the portion where the failure occurs is stopped or electrically disconnected from the pertinent network and the normal port in the current system is operated as it is. Further, the address of a port of the standby system corresponding to the failed port where the failure occurs is changed to an address of the failed port, that is, the port of the standby system is caused to be able to perform transmission and reception. Thus, change of the transmission route of packet data can be minimized and communication between the networks can be continued. In other words, even if a failure occurs in a portion of the current router, it is not necessary to change the whole current system to the standby system as in the prior art, the route corresponding to only the failed portion is changed and the routes in the normal portions of the current system are not required to be changed.

Further, the relay address of the packet data from a terminal is not required to be changed and the route is automatically changed so that the packet data is transmitted to the terminal of the destination.

In other words, since the relay address of the packet data from the terminal is not required to be changed and the packet data from the terminal is automatically transmitted to the destination terminal, the terminal can perform communication without considering change of the route for the communication.

As described above, according to the present invention, the reliable and inexpensive LAN system can be constructed by realization of duplication at a unit of port. Further, the terminal having neither dynamic routing function nor ARP function can communicate without considering change of a route. In addition, management of the network such as collection of statistical information and the like can be made without considering the redundant configuration.

In order to achieve the above objects, according to another aspect of the present invention, there is provided a network system further comprising a management terminal connected to the one of the plurality of networks for managing management information base (MIB) information of each of the plurality of first and second ports, wherein the first internetwork apparatus further comprises a first MIB information memory unit for storing the management information base information for each of the plurality of first ports, and a first MIB information control unit connected to the first MIB information memory unit and the first transmitting and receiving unit, and the second internetwork apparatus further comprises a second MIB information memory unit for storing management information base (MIB) information for each of the plurality of second ports, and a second MIB information control unit connected to the second MIB information memory unit and the second transmitting and receiving unit, the management terminal sending a collection request of management information base information of the one of the plurality of first ports through the one of the plurality of networks, the one of the plurality of second ports and the second transmitting and receiving unit to the second MIB information control unit after the one of the plurality of second ports has been caused to be able to transmit and receive data to and from the one of the plurality of networks, the second MIB information control unit being responsive to the collection request of the management information base information from the management terminal to read out management information base information from the second MIB information memory unit after the one of the plurality of second ports has been caused to be able to transmit and receive data, and sending a collection request of management information base information available before occurrence of failure of the one of the plurality of first ports through the second transmitting and receiving unit, the data transmission unit and the first transmitting and receiving unit to the first MIB information control unit, the first MIB information control unit being responsive to the collection request of the management information base information from the second MIB information control unit to read out management information base information available before occurrence of failure of the one of the plurality of first ports from the first MIB information memory unit and transmitting the management information base information through the first transmitting and receiving unit, the data transmission unit and the second transmitting and receiving unit to the second MIB information control unit, the second MIB information control unit calculating a sum total of management information base information read out from the first and second MIB information memory units to send the sum total through the second transmitting and receiving unit, the one of the plurality of second ports and the one of the plurality of networks to the management terminal.

As described above, when the collection request of the statistical information (MIB) is issued from the management terminal of the network to the system having the redundant configuration, the internetwork apparatus operating as the current system reads out the statistical information of the internetwork apparatus serving as the standby system and the statistical information of the whole redundant configuration system is collectively returned to the management terminal. Thus, the management terminal can manage the networks without considering the physical redundant configuration.

As described above, even if a failure occurs in a port of the current system, operation of only the failed port (or all ports included in the routing module of the failed port) is stopped and other normal ports of the current system are continued to be operated, so that the port of the standby system corresponding to the failed port (or the stopped port) is operated. Accordingly, the past management information base (MIB) concerning the stopped port of the current system can be obtained. Hence, the networks can be managed on the basis of the management information base (MIB) information available before occurrence of the failure.

Further, since the address of the port where the failure occurs is used as the address of the port of the standby system operated instead, the management terminal can obtain the management information base (MIB) information of the port of the current system of which operation is automatically stopped without changing the address of the source requiring the MIB information regardless of change of the route.

BRIEF DESCRIPTION OF THE DRAWINGS

FIGS. 2A and 2B show information stored in definition information memory units of current and standby routers of FIGS. 1A and 1B, respectively;

FIGS. 4A and 4B show contents of routing tables in the current and standby routers in case where the network system of FIGS. 1A and 1B is operated normally, respectively;

FIGS. 6A and 6B show contents of routing tables in the current and standby routers after the route has been changed in the case shown in FIG. 5, respectively;

FIGS. 8A and 8B show contents of routing tables in the current and standby routers after the route has been changed in the case shown in FIG. 7, respectively;

FIGS. 10A and 10B show contents of routing tables in the current and standby routers after the route has been changed in the case shown in FIG. 9, respectively;

FIG. 11 is a flow chart showing a procedure of the process in case where a failure occurs in the current router in the first embodiment;

FIGS. 13A and 13B show contents routing tables in the current and standby routers after the route has been changed in the case shown in FIG. 12, respectively;

FIGS. 15A and 15B show contents of routing tables 16 and 26 in the normal state of a router 11 in the third embodiment;

FIGS. 16A and 16B show contents of the routing tables 16 and 26 after the route has been changed in response to occurrence of a failure in a port A1 in the third embodiment;

FIGS. 17A and 17B show contents of the routing tables 16 and 26 after the route has been changed in response to occurrence of a failure in the port A1 in a fourth embodiment of a network system according to the present invention;

DESCRIPTION OF THE PREFERRED EMBODIMENTS

Figure 1A:
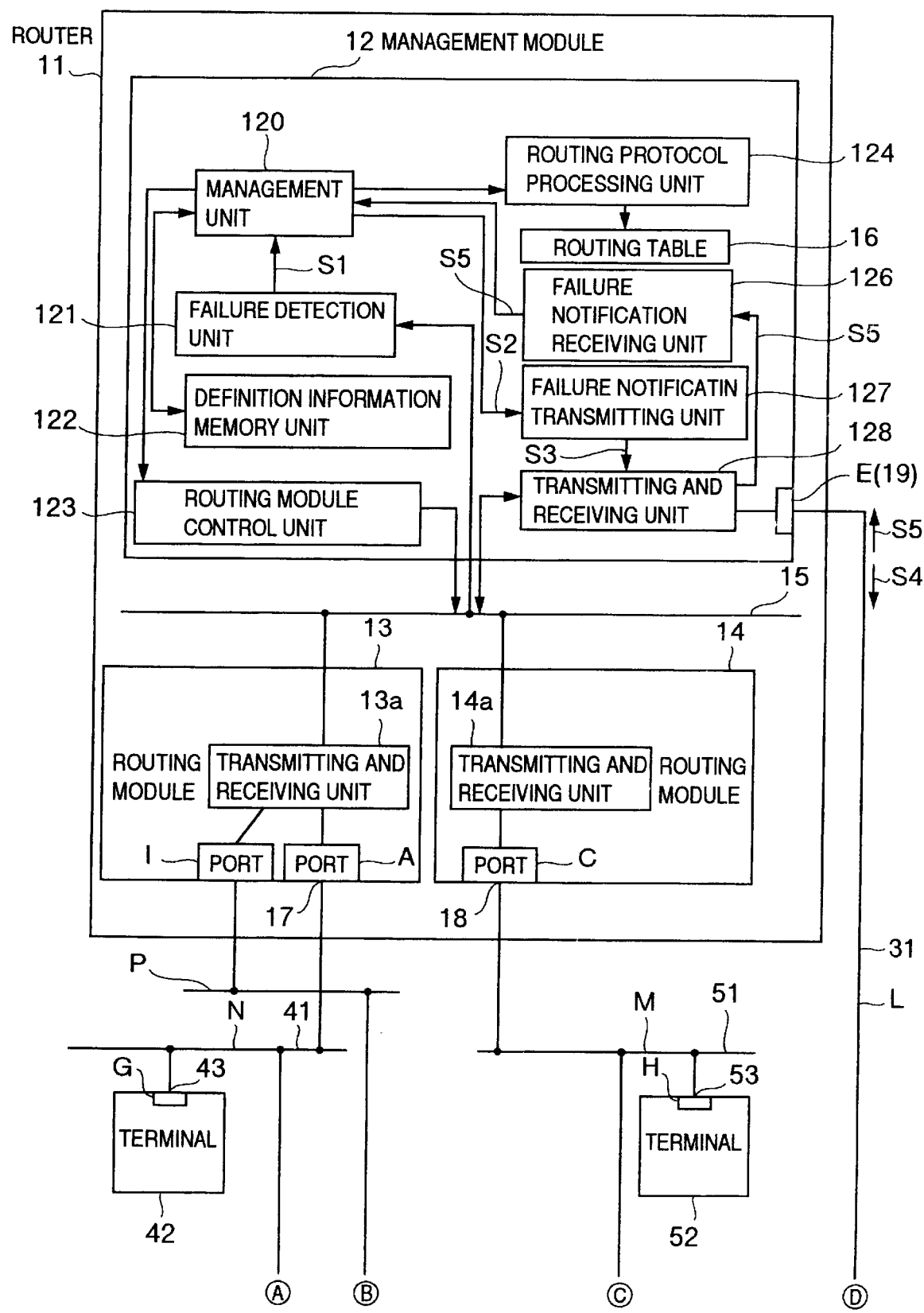
FIGS. 1A and 1B are block diagrams schematically illustrating a first embodiment of a network system according to the present invention.

Embodiments of a network system according to the present invention are now described in detail with reference to the accompanying drawings.

In the following description, elements represented by the same reference numerals have the same functions and overlapped description thereof is omitted.

Figure 1B:
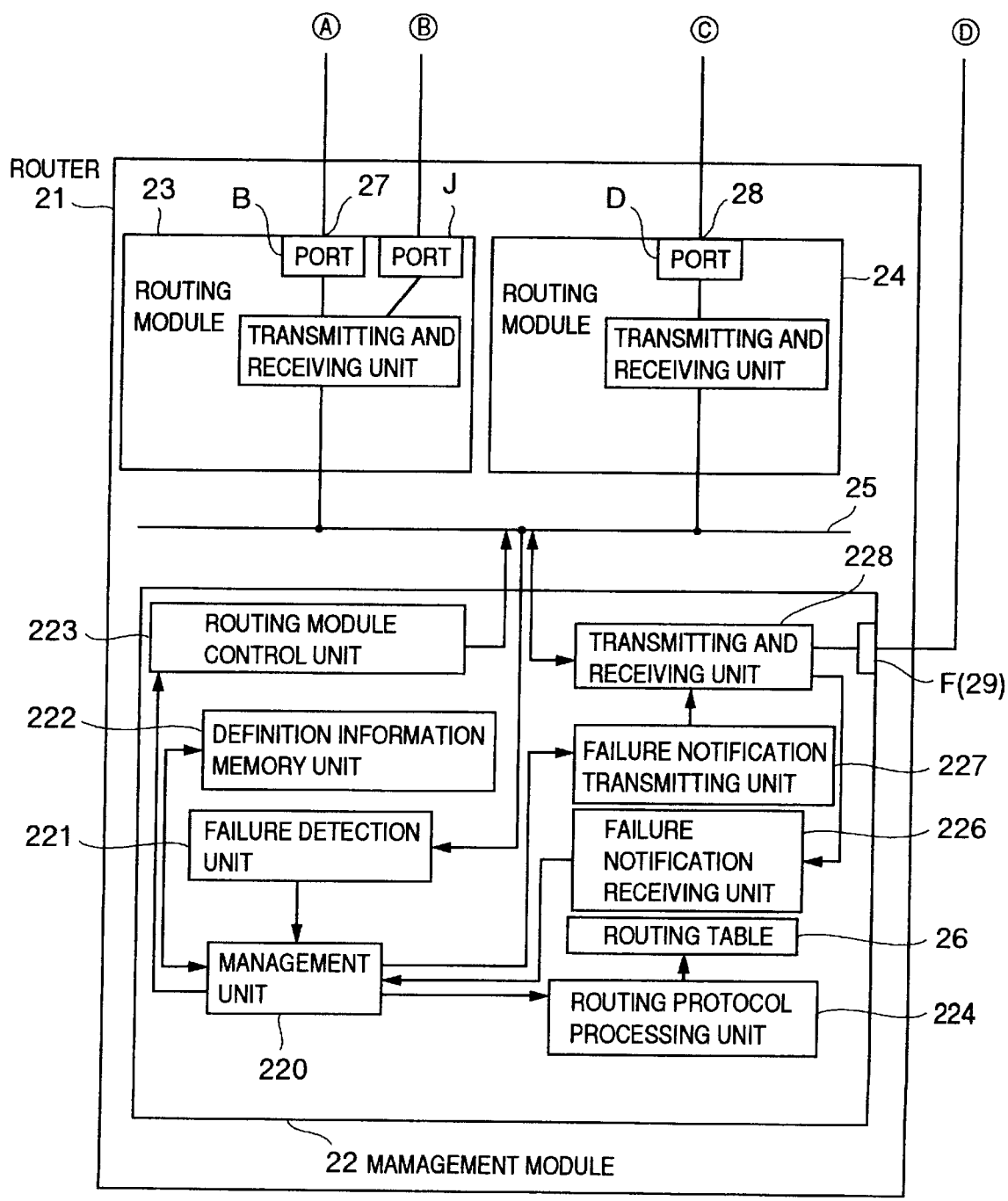

FIGS. 1A and 1B are block diagrams schematically illustrating an embodiment of the network system according to the present invention.

In FIGS. 1A and 1B, reference numerals 11 and 21 denote internetwork apparatuses, that is, routers in the embodiment.

Reference numeral 31 denotes an inter-apparatus communication bus used to perform data communication between the routers 11 and 21, 41 and 51 networks N and M, respectively, 42 and 52 terminals, 43 a port G of the terminal 42 connected to the network 41, and 53 a port H of the terminal 52 connected to the network 51. Numerals 12 and 22 denotes management modules of the routers 11 and 21, respectively. The management module 12 of the router 11 includes a port E (19) for performing communication with the management module 22 of the router 21 through the inter-apparatus communication bus 31. The management module 22 of the router 21 includes a port F (29) for performing communication with the management module 12 of the router 11 through the inter-apparatus communication bus 31. Numerals 13 and 14 denote interface modules, that is, routing modules of the router 11 for connecting the router 11 and the networks N, M, P and L, respectively, 23 and 24 interface modules, that is, routing modules of the router 21 for connecting the router 21 and the networks N, M, P and L, respectively. The routing module 13 includes a port A (17) connected to the network 41 and the routing module 14 includes a port C (18) connected to the network 51. The routing module 23 includes a port B (27) connected to the network 41 and the routing module 24 includes a port D (28) connected to the network 51. Numerals 15 and 25 router buses for the routers 11 and 21, respectively, and 16 and 26 routing tables for the routers 11 and 21, respectively. The port E (19) and the port F (29) are connected to each other through the inter-apparatus communication bus 31.

The present invention can be applied to a network system including routers each having at least one routing module, the routing module of each router having at least one port, and the port of each router connected to a network different from a network connected to the port of another router.

For simplification of description, in the embodiment, it is assumed that the network system includes only two networks and each router includes only two routing modules. However, the present invention can be applied to the network system including three or more networks. Further, each router may include three or more routing modules.

Furthermore, the routing modules 14, 23 and 24 each include only one port, while each routing module may include a plurality of ports, each of which may be connected to a different network. Accordingly, for example, as shown in FIGS. 1A and 1B, the routing module 13 includes two ports A and I, which may be connected at one end thereof to a transmitting and receiving unit 13a and at the other end thereof to the networks N and P, respectively. Thus, the routing module 23 corresponding to the routing module 13 may include two ports B and J.

The router 11 includes the management module 12 and the routing modules 13 and 14 and these modules are connected to one another through a router bus 15. The management module 12 possesses the function of managing the states of the routing modules 13 and 14, the function of preparing the routing table 16 in accordance with the routing protocol, the function of communicating with the router 21 through the inter-apparatus communication bus 31, and the like. The routing modules 13 and 14 possess the function of relaying an IP frame in accordance with the routing table 16 prepared by the management module 12.

The routing table includes relay route selection information, that is, routing information for dynamically determining among other routers a relay port of packet data received by the router constituting the internetwork apparatus.

The routing module 13 includes the ports A (17) and I and the transmitting and receiving unit 13a for transmitting and receiving data. The routing module 14 includes the port C (18) and a transmitting and receiving unit 14a for transmitting and receiving data.

The transmitting and receiving unit 13a performs transmission and reception of data through the ports A and I to and from the networks N and P, respectively, and also performs transmission and reception of data through the router bus 15 to and from the management module 12 and the routing module 14. The transmitting and receiving unit 14a performs transmission and reception of data through the port C to and from the network M and also performs transmission and reception of data through the router bus 15 to and from the management module 12 and the routing module 13.

The router 21 includes the management module 22 and the routing modules 23 and 24 and these modules are connected to one another through the router bus 25. The management module 22 possesses the function of managing the states of the routing modules 23 and 24, the function of preparing the routing table 26 in accordance with the routing protocol, the function of communicating with the router 11 through the inter-apparatus communication bus 31, and the like. The routing modules 23 and 24 possess the function of relaying an IP frame in accordance with the routing table 26 prepared by the management module 22.

The routing modules 23 and 24 include the ports B (27) and D (28) and transmitting and receiving units 23a and 24a for transmitting and receiving data, respectively.

The transmitting and receiving unit 23a performs transmission and reception of data through the ports B and J to and from the networks N and P, respectively, and also performs transmission and reception of data through the router bus 25 to and from the management module 22 and the routing module 24. The transmitting and receiving unit 24a performs transmission and reception of data through the port D to and from the network M and also performs transmission and reception of data through the router bus 25 to and from the management module 22 and the routing module 23.

The inter-apparatus communication bus 31 connects between the management module 12 of the router 11 and the management module 22 of the router 21. The inter-apparatus communication bus 31 constitutes a route for notifying failure information of the routing module detected by one router to the management module of the other router and a bypass route upon occurrence of failure.

The detailed configuration and function of the management modules 12 and 22 of the routers 11 and 21 are now described.

The management module 12 includes, as shown in FIGS. 1A and 1B, a management unit 120, a failure detection unit 121, a definition information memory unit 122, a routing module control unit 123, a routing protocol processing unit 124, the routing table 16, a failure notification receiving unit 126, a failure notification transmitting unit 127 and a transmitting and receiving unit 128.

Similarly, the management module 22 includes, as shown in FIGS. 1A and 1B, a management unit 220, a failure detection unit 221, a definition information memory unit 222, a routing module control unit 223, a routing protocol processing unit 224, the routing table 26, a failure notification receiving unit 226, a failure notification transmitting unit 227 and a transmitting and receiving unit 228.

Since the functions of the management unit 120, the failure detection unit 121, the definition information memory unit 122, the routing module control unit 123, the routing protocol processing unit 124, the routing table 16, the failure notification receiving unit 126, the failure notification transmitting unit 127 and the transmitting and receiving unit 128 of the management module 12 are the same as the functions of the management unit 220, the failure detection unit 221, the definition information memory unit 222, the routing module control unit 223, the routing protocol processing unit 224, the routing table 26, the failure notification receiving unit 226, the failure notification transmitting unit 227 and the transmitting and receiving unit 228 of the management module 22, respectively, only the functions of the units of the management module 12 are now described.

The transmitting and receiving unit 128 performs transmission and reception of data through the router bus 15 to and from the routing modules 13 and 14 and also performs transmission and reception of data through the inter-apparatus communication bus 31 (network L) to and from the router 21. Further, the transmitting and receiving unit 128 transmits failure notification S4 to the other system (router 21) through the inter-apparatus communication bus 21 in response to a failure notification transmission request S3 from the failure notification transmitting unit 127. Furthermore, the transmitting and receiving unit 128 receives failure notification S5 transmitted from the other system (router 21) through the inter-apparatus communication bus 31 and sends the failure notification S5 of the other failure notification S5 to the failure notification receiving unit 126.

The failure notification transmitting unit 127 supplies the failure notification transmission request S3 to the transmitting and receiving unit 128 in response to an failure notification indication S2 from the management system to the other system.

The failure notification receiving unit 126 receives the failure notification S5 from the other system supplied from the transmitting and receiving unit 128 and supplies the failure notification S5 to the management unit 120.

The failure detection unit 121 detects failure of the routing modules 13 and 14 of the router 11, failure of the port of the routing modules 13 and 14, and failure of the route, that is, a connection equipment (for example, cable, hub and the like) between the port and the network connected to the port (that is, failure of the routing module or the connection portion of the routing module and the network connected to the routing module). When the failure detection unit 121 detects a failure, the failure detection unit 121 sends failure notification S1 indicating a failure detection portion to the management unit 120. The management unit 120 recognizes the portion where the failure occurs in accordance with the notification S1.

The definition information memory unit 122 is a memory, for example a table, for storing data indicating whether the network system includes a standby system or not, an inherent address and a common address of the ports of the router 11, and the like.

The routing protocol processing unit 124 calculates the routing protocol in accordance with state change notification of a port from the management unit 120 to prepare and update contents of the routing table 16.

The routing module control unit 123 indicates start and stop of the routing modules 13 and 14 of the router 11 and performs start and stop of the ports of the router 11 and setting and change of addresses in accordance with instructions from the management unit 120.

The management unit 120 indicates start and stop of the routing modules 13 and 14 of the router 11 and instructs the routing module control unit 123 to assign addresses to the ports of the routing modules 13 and 14. Further, the management unit 120 notifies the change of state of the ports of the routing modules 13 and 14 to the routing protocol processing unit 124. The change of state includes modification of the configuration, start (up) and stop (down) of a port due to occurrence of a failure or the like, change of the IP address of a port and the like.

The management unit 120 specifies a failure portion in response to the failure notification S1 from the failure detection unit 121 and supplies a function stop indication of the port corresponding to the specified failure portion and a start and stop indication of the routing module (the case where the function of the routing module itself is stopped) to the routing module control unit 123.

More particularly, i) when a failure occurs in the routing module 13 or 14, the function stop indication of all ports of the routing module where the failure occurs and the function stop indication of the routing module itself where the failure occurs are supplied to the routing module control unit 123, ii) when a failure occurs in a port of the routing modules 13 and 14, the function stop indication of the port where the failure occurs is supplied to the routing module control unit 123, and iii) when a failure occurs in the route between a port and the network connected to the port, the function stop indication of the port is supplied to the routing module control unit 123. The routing module control unit 123 stops the function of the indicated routing module and/or the port or electrically disconnects the indicated port from the network pertinent thereto in accordance with the function stop indication from the management unit 120.

Further, the management unit 120 refers to information (information as to whether there is provided a standby system or not) of the definition information memory unit 122 in response to the failure notification S1 from the failure detection unit 121 and supplies the failure notification indication S2 for the other system (router 21) to the failure notification transmitting unit 127 on the basis of the referred information. That is, when there is provided the standby system, information relative to occurrence of a failure in the router 11 and the number of the port concerning the portion where the failure occurs are issued as the failure notification indication S2. When there is not provided the standby system, the failure notification indication S2 is not issued.

Further, the management unit 120 refers to information of the definition information memory unit 122 in response to the failure notification S1 from the failure detection unit 121 to instruct the routing module control unit 123 to stop the port where the failure occurs or disconnect the port from the pertinent network and notify the change of state of the port, that is, stop of the port to the routing protocol processing unit 124. The routing module control unit 123 stops or disconnects the instructed port in response to this instruction. Further, the routing protocol processing unit 124 recalculates the routing protocol and updates the contents of the routing table 16 in response to the state change notification of the port.

Furthermore, the management unit 120 refers to information of the definition information memory unit 122 in response to the failure notification S5 of the other system from the failure notification receiving unit 126 to instruct the routing module control unit 123 to change the address of the port of the router 11 corresponding to the port relative to the portion of the other system where the failure occurs and notify the change of state of the failed port to the routing protocol processing unit 124.

In addition, after communication is restored after occurrence of a failure in a port, the management unit 120 performs the failure restoration process of the port and assigns an inherent IP address to the port at this time. The failure restoration process is performed as follows. The inherent IP address is set to the port in response to the indication from the management unit 120 to the routing module control unit. Further, the state change notification of the port, that is, the notification indicating that the port becomes the start (up) state is sent to the routing protocol processing unit 124 in response to the indication from the management unit 120. The routing protocol processing unit 124 recalculates the routing protocol and updates the routing table 16 in response to the notification. Consequently, the port can be used as a port (standby port) of the standby system.

The address system of the internetwork apparatus (router in the embodiment) is now described.

In the present invention, each port includes first address information (IP address) of a network layer composed of a network number peculiar to a network connected to the port and a host number peculiar to the port and second address information (MAC address) of a physical layer peculiar to the port.

The apparatus of the embodiment includes a relay IP address and a relay MAC address common to both the routers 11 and 12 in addition of the IP address and the MAC address peculiar to each of the routers 11 and 12. A relay IP address and a relay MAC address common to both the routers are defined in the port of the routing module of the current router for connection to an external terminal.

In the embodiment, the relay IP address and the relay MAC address are always used as the IP address and the MAC address of the port of the router operating as the current system and the IP address and the MAC address peculiar to the ports are used for the ports of the router of the standby system.

In the embodiment, as described below, the relay IP address and the relay MAC address are used as an interface of the internetwork apparatus in a terminal of a work station (WS), a personal computer (PC) or the like. Thus, when a port (route) used to perform communication is changed, a conventional destination address available before change of the route, that is, the relay IP address and the relay MAC address are used to perform communication without considering change of the route in the terminal even when the terminal does not include the dynamic routing function and the ARP function.

More particularly, in the present invention, when a failure occurs in the current system, the IP address of the port of the standby system is changed from the peculiar or inherent IP address to the relay IP address and at the same time the MAC address is also changed from the peculiar or inherent MAC address to the relay MAC address to thereby attain change of the communication route from the current system to the standby system. The realization system for three cases of failure occurrence portions is now described while attention is paid to the change of the IP address. The change of the MAC address can be made in the same manner as the IP address.

The IP addresses used in the following description are defined as follows:

x is an IP address common to ports A and B.

a is an IP address peculiar to the port A.

b is an IP address peculiar to the port B.

y is an IP address common to ports C and D.

c is an IP address peculiar to the port C.

d is an IP address peculiar to the port D.

e is an IP address peculiar to a port E.

f is an IP address peculiar to a port F.

Description of ports G, H, I and J is omitted.

FIGS. 2A and 2B show information stored in the definition information memory units 122 and 222 of the routers 11 and 21, respectively. Numerals 122a and 222a represent data indicating whether the standby system is provided or not. In the embodiment, since the router 11 is the current system and the router 21 is the standby system, the data 122a is, for example, "1" indicating that the standby system is provided and the data 222a is, for example, "0" indicating that the standby system is not provided. The definition information memory unit 122 stores the inherent IP addresses, the inherent MAC addresses, the relay IP addresses and the relay MAC addresses for the ports A and C of router 11. Similarly, the definition information memory unit 222 stores the inherent IP addresses, the inherent MAC addresses, the relay IP addresses and the relay MAC addresses for the ports B and D of the router 21. Further, data 122A, 122C, 222B and 222D represent whether the ports A, C, B and D are the current ports or the standby ports and when the data is, for example, "1", the port is the current port and when the data is, for example, "0", the port is the standby port.

Further, the ports I and J of the routing modules 13 and 23 are not shown in FIGS. 2A and 2B and description thereof is omitted.

Figure 3:
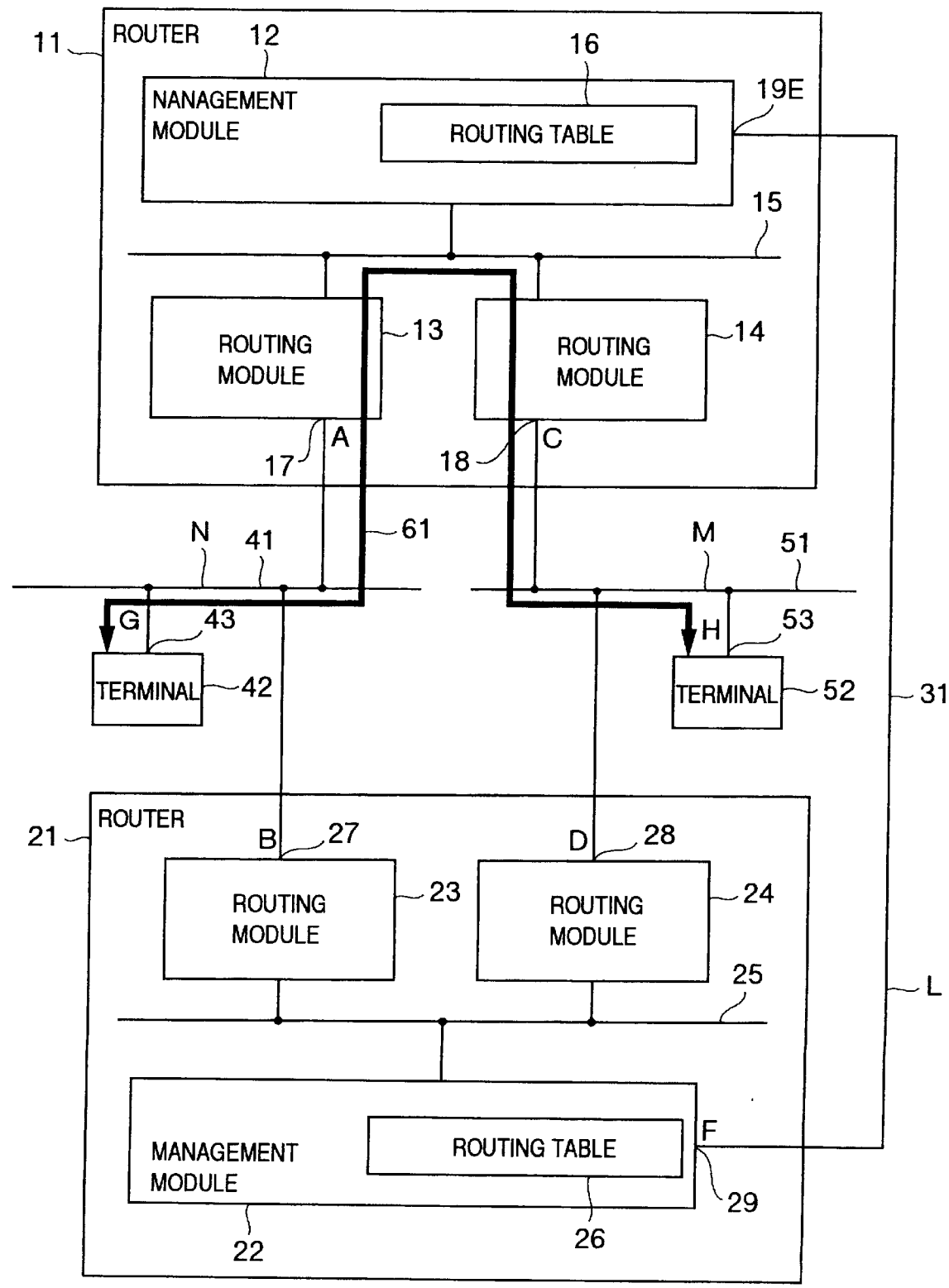
FIG. 3 shows a route of communication data in case where the network system of FIGS. 1A and 1B is operated normally.

Referring now to FIGS. 3, 4A and 4B, operation in case where the network system of FIGS. 1A and 1B is operated normally is described. FIG. 3 shows a route of communication data in case where the network system of FIGS. 1A and 1B is operated normally. The configuration of the management module 12, the routing modules 13, 14, 23 and 24 is simplified but is the same as that of FIGS. 1A and 1B. When the router 11 of the current system is operated normally, the communication route of data between the terminals 42 and 52 is formed through the router 11 as shown by arrow 61 of FIG. 3. FIGS. 4A and 4B show the contents of the routing table 11 of the current router 11 and the routing table 21 of the standby router 21, respectively, in case where the network system of FIGS. 1A and 1B is operated normally. In FIGS. 4A and 4B, the networks N, M and L represent the networks 41 and 51 and the inter-apparatus communication bus 31, respectively.

In the embodiment, the address system in case where the network system is operated normally between the terminal 42 of the network 41 and the terminal 52 of the network 51 is as follows:

IP address of the port A: x

IP address of the port B: b

IP address of the port C: y

IP address of the port D: d

IP address of the port E: e

IP address of the port F: f

More particularly, in the embodiment, since the router 11 is the current system, the IP and MAC addresses of the port A of the router 11 connected to the terminal 42 through the network N are not the inherent IP and MAC addresses and are the relay IP and MAC addresses x and x', respectively. Similarly, the IP and MAC addresses of the port C of the router 11 connected to the terminal 52 through the network M are not the inherent IP and MAC addresses and are the relay IP and MAC addresses y and y', respectively.

On the other hand, since the router 21 is the standby system, the IP and MAC addresses of the ports B and D of the router 21 connected to the terminals 42 and 52 through the networks N and M are the inherent IP and MAC addresses, respectively.

Accordingly, the routing protocol processing units 124 and 224 calculate the routing protocol to thereby set the contents of the routing tables 16 and 26 as shown in FIGS. 4A and 4B.

In other words, in the router 11, when the destination is the network N, the next relay port is the port having the IP address x, that is, the port A of the routing module 13. Similarly, when the destination is the network M, the next relay port is the port having the IP address y, that is, the port C of the routing module 14. Further, when the destination is the network L, the next relay port is the port having the IP address e, that is, the port E.

On the other hand, in the router 21, when the destination is the network N, the next relay port is the port having the IP address b, that is, the port B of the routing module 23. Similarly, when the destination is the network M, the next relay port is the port having the IP address d, that is, the port D of the routing module 24. Further, when the destination is the network L, the next relay port is the port having the IP address f, that is, the port F.

Accordingly, when the system network is operated normally, that is, when the router is operated normally as the current system, data communication between the terminals 42 and 52 is performed by the router 11 with reference to the routing table 16 as follows.

In the embodiment, whether any of the routers 11 and 21 is the current system, the relay (next destination for transmission) address of packet data from the terminal 42 is always x and the relay (next destination for transmission) address of packet data from the terminal 52 is always y.

Data transmission from the terminal 42 to the terminal 52 is first described. The destination of the packet data from the terminal 42 (port G) is the terminal 52 (port H) (network M) and the relay address thereof is x.

In this case, as described above, since the IP address of the port A is x, the packet data from the terminal 42 is received by the port A of the routing module 13 having the IP address of x. The transmitting and receiving unit 13a of the routing module 13 refers to the routing table 16 shown in FIG. 4A and since the destination of the received packet data is the network M, the received packet data is transferred through the router bus 15 and the transmitting and receiving unit 14a of the routing module 14 to the port having the address y, that is, the port C. The transmitting and receiving unit 14a sends the packet data to the network M. Since the final destination of the packet data is the port H, the packet data is received by the terminal 52.

On the other hand, data communication from the terminal 52 to the terminal 42 is described. The destination of the packet data from the terminal 52 (port H) is the terminal 42 (port G) (network N) and the relay address thereof is y.

In this case, as described above, since the IP address of the port C is y, the packet data from the terminal 52 is received by the port C of the routing module 14 having the IP address of y. The transmitting and receiving unit 14a of the routing module 14 refers to the routing table 16 shown in FIG. 4A and since the destination of the received packet data is the network N, the received packet data is transferred through the router bus 15 and the transmitting and receiving unit 13a of the routing module 13 to the port having the address x, that is, the port A. The transmitting and receiving unit 13a sends the packet data to the network N. Since the final destination of the packet data is the port G, the packet data is received by the terminal 42.

As described above, when the router 11 is operated normally as the current system, the packet data from the terminal 42 to the terminal 52 is transmitted through the ports A and C to the port H and the packet data from the terminal 52 to the terminal 42 is transmitted through the ports C and A to the port G.

The port in which the relay address is set as the IP address is the communicable port, that is, the port capable of transmitting and receiving data to and from the router bus and the pertinent network. Accordingly, such a port is in the transmittable and receivable state to the pertinent network. On the other hand, the port in which the inherent address is set as the IP address is the port from which data can be transmitted to the pertinent network and which can receive part of data from the pertinent network and cannot receive part of the data. More particularly, the port having the inherent address can receive data when the terminal connected to the port through a network transmits the data to the inherent address and cannot receive the data when the terminal transmits the data to an address other than the inherent address. In other words, in the embodiment, since the terminal G transmits data to the IP address, the data from the terminal G can be received by only the port having the IP address x as the inherent address. Accordingly, the data from the terminal G can be received by only the port having the IP address x as the inherent address. Hence, since the port B has the inherent address b as the IP address in the normal state of the router 11, the port B cannot receive the data from the terminal G. However, when another terminal not shown connected to the network N transmits or broadcasts data to the IP address, the port B can receive the data. Accordingly, the port B is in the state where the port B can perform only transmission to the terminal G.

Further, the port in which the IP address is not set cannot transmit and receive data to and from the pertinent network. Accordingly, such a port is in the state where the port cannot perform transmission and reception to and from the pertinent network.

Change of a route for communication data when a failure occurs in the network system is now described. In the following description, description of the MAC address is omitted.

Referring now to FIGS. 5, 6A, 6B and 11, the case where a failure occurs in the port A of the current router 11 is described as a first example.

Figure 5:
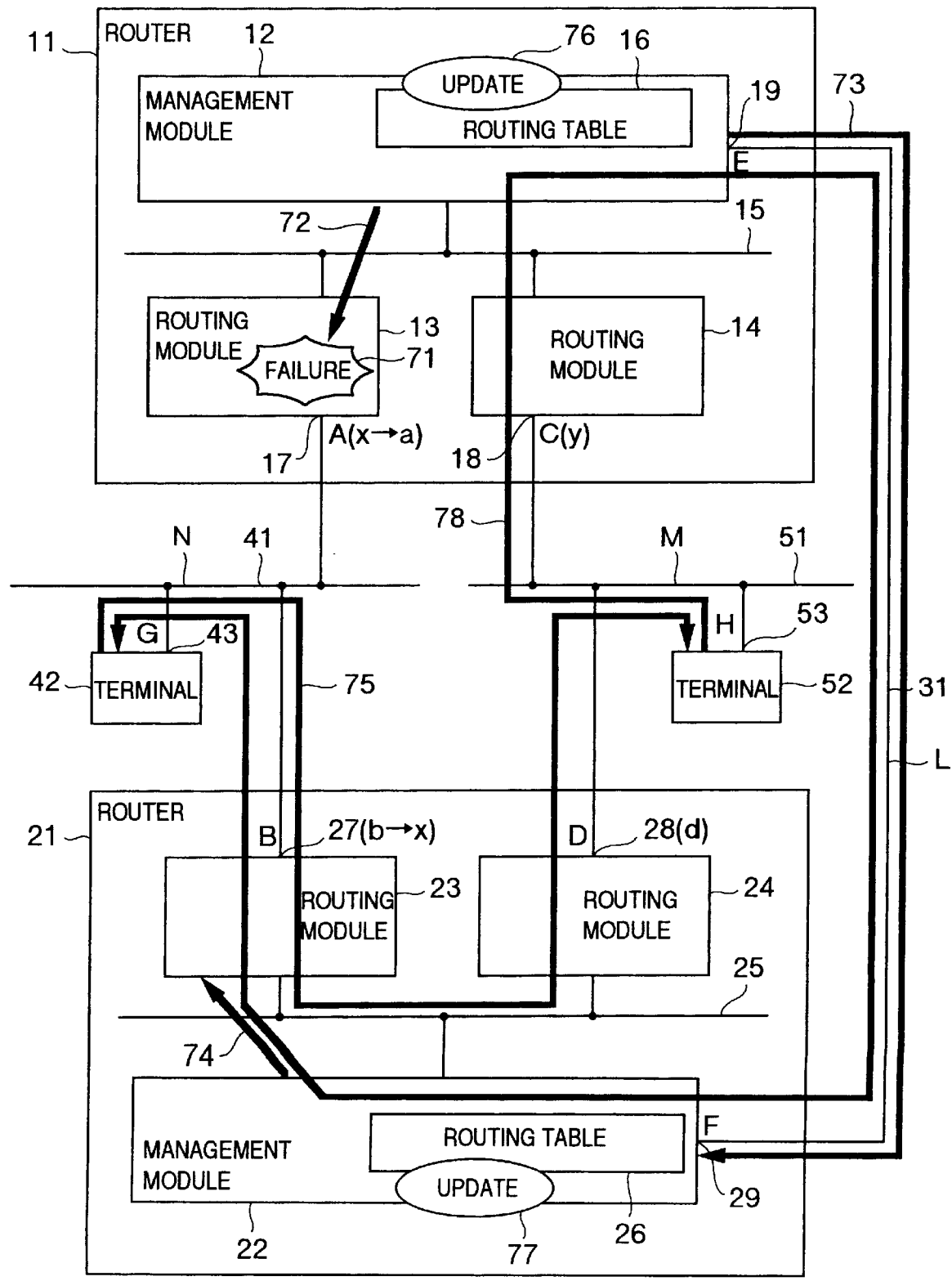
FIG. 5 shows a route of communication data in case where a failure occurs in a current port A in the network system of FIGS. 1A and 1B.

FIG. 5 is a diagram showing a procedure of changing a route when a failure occurs in the port A (17) and shows occurrence of a failure 71 in the port A (17) of the routing module 13 of the router 11 connected to the network N (41). Numeral 72 represents that the management module 12 of the router 11 detects the failure 71 in the port A (17). Numeral 73 represents that the management module 12 of the router 11 notifies the failure 71 in the port A (17) to the management module 22 of the router 21 through the inter-apparatus communication bus 31. Numeral 74 represents that the management module 22 of the router 21 changes the IP address of the port B (27) of the routing module 23 of the router 21 connected to the network N (41). Numeral 75 represents the route from the terminal 42 to the terminal 52. Numeral 76 represents that the routing protocol included in the management module 12 of the router 11 updates the routing table 16. Numeral 77 represents that the routing protocol included in the management module 22 of the router 21 updates the routing table 26. Numeral 78 represents the route from the terminal 52 to the terminal 42.

FIGS. 6A and 6B show the contents of the routing table after the route has been changed due to occurrence of the failure in the port A (17). FIG. 6A shows the contents of the routing table 16 prepared by the management module 12 of the router 11 and FIG. 6B shows the contents of the routing table 26 prepared by the management module 22 of the router 21.

FIG. 11 is a flow chart showing a procedure performed upon occurrence of a failure in the embodiment. Referring now to FIGS. 1 and 11, the process upon occurrence of the failure in the port A (17) is described.

In the normal communication state where no failure occurs, communication is performed as shown in FIG. 3 (step 301). When a failure occurs in the port A of the router 11 in this state, the communication between the terminals 42 and 52 is stopped (step 302). The failure detection unit 121 detects the failure in the port A of the routing module 13 and sends the failure notification S1 indicating the failure detection portion to the management unit 120. The management unit 120 recognizes the occurrence of the failure and the failure detection portion which is the port A in accordance with the notification S1 (step 303).

When the management unit 120 specifies the failure portion in accordance with the failure notification S1, the management unit 120 supplies the indication of stopping the function of the port A which is the specified failure portion (or the indication of disconnecting the port A) to the routing module control unit 123. The routing module control unit 123 stops the function of the port A or disconnects the port A from the network N in accordance with the function stop indication from the management unit 120.

Further, the management unit 120 refers to the information of the definition information memory unit 122 shown in FIG. 2A in response to the failure notification S1 from the failure detection unit 121 and examines whether the standby system is provided or not. In this case, since the standby system is provided, the management unit 120 supplies to the failure notification transmitting unit 127 the failure notification indication S2 for notifying "the effect that the failure occurs in the port A" to the standby router 21. The failure notification transmitting unit 127 supplies the failure notification transmission request S3 to the transmitting and receiving unit 128 in response to the failure notification indication S2 from the management unit 120. The transmitting and receiving unit 128 sends the failure notification S4 for notifying "the effect that the failure occurs in the port A" through the inter-apparatus communication bus 31 to the standby router 21 in response to the failure notification transmission request S3 from the failure notification transmission unit 127 (step 304).

Further, the management unit 120 recognizes that the failure occurrence portion is only the port A (step 305) and the process proceeds to step 306. The transmitting and receiving unit 228 of the router 21 receives the failure notification S4 transmitted from the router 11 through the inter-apparatus communication bus 31 and sends the failure notification S4 to the failure notification receiving unit 226. The failure notification receiving unit 226 supplies the failure notification S4 to the management unit 220 in response to the failure notification S4 from the transmitting and receiving unit 228. The management unit 220 refers to the information of the definition information memory unit 222 (FIG. 2B) in response to the failure notification S4 from the failure notification receiving unit 226 and instructs the routing module control unit 223 to change the address of the port B of its own system (router 21) corresponding to the port A where the failure occurs. In other words, the management unit 220 instructs the routing module control unit 223 to change the IP address of the port B from the inherent address b to the relay (common) address x (step 306).

As described above, by changing the IP address of the port B connected through the network N to the port A where the failure occurs, the route from the terminal 42 to the terminal 52 is restored (step 307).

Further, the management unit 120 notifies the change of state of the port A, that is, the malfunction of the port A (stop of the function of the port A) to the routing protocol processing unit 124 in response to the failure notification S1 from the failure detection unit 121. The routing protocol processing unit 124 recalculates the routing protocol by means of the protocol such as the known RIP, OSPF or the like in response to the notification and updates the contents of the routing table 16 (step 310). In other words, as shown in FIG. 6A, in the router 11, when the destination is the network N, the next relay port is not the port of the routing module 13 since the port A is stopped, and the next relay port is the port E (19). Accordingly, the next hop for the network N is changed from x to e. When the destination is the network M or L, the next hop is y or e, respectively, as it is.

On the other hand, the management unit 220 notifies change of the IP address of the port B to the routing protocol processing unit 224 in accordance with change of the address of the port B in step 306 in response to the failure notification S4 from the failure detection unit 221. The routing protocol processing unit 224 recalculates the routing protocol by means of the known RIP, OSPF or the like in response to the notification from the management unit 220 and updates the contents of the routing table 26 (step 310). In other words, as shown in FIG. 6B, in the router 21, when the destination is the network N, the next relay port is the port having the address x, that is, the port B of the routing module 23. Accordingly, the next hop for the network N is changed from b to x. When the destination is the network M or L, the next hop is d or f, respectively, as it is.

As described above, the mutual route between the terminals 42 and 52 is restored (step 312), so that communication between the terminals 42 and 52 is restored to thereby return to the normal communication state (step 313).

More particularly, the communication between the terminals 42 and 52 is made through the following route.

First, data communication from the terminal 42 to the terminal 52 is described with reference to FIGS. 1 and 5. The destination of the packet data from the terminal 42 (port G) is the terminal 52 (port H) (network M) and the destination address of the routing module to be relayed is x in the same manner as in the normal state.

In this case, as described above, the port A is stopped or disconnected due to occurrence of failure and the IP address of the port B is changed from b to x. Accordingly, the packet data from the terminal 42 is received by the port B of the routing module 23 having the IP address of x. The transmitting and receiving unit 23*a* of the routing module 23 refers to the routing table 26 shown in FIG. 6B and since the destination of the received packet data is the network M, the next hop is d. The transmitting and receiving unit 23*a* transfers the received packet data to the port having the address d, that is, the port D through the router bus 25 and the transmitting and receiving unit 24*a* of the routing module 24 in accordance with the routing table 16. The transmitting and receiving unit 24*a* sends the packet data to the network M. Since the final destination of the packet data is the port H, the packet data is received by the terminal 52.

On the other hand, data communication from the terminal 52 to the terminal 42 is now described. The destination of the packet data from the terminal 52 (port H) is the terminal 42 (port G) (network N) and the destination address of the routing module to be relayed is y in the same manner as in the normal state.

In this case, as described above, since the IP address of the port C is y, the packet data from the terminal 52 is received by the port C of the routing module 14 having the IP address of y. The transmitting and receiving unit 14*a* of the routing module 14 refers to the routing table 16 shown in FIG. 6A and since the destination of the received packet data is the network N, the next hop is e. Since the destination of the received packet data is the network N, the transmitting and receiving unit 14*a* sends the received packet data to the transmitting and receiving unit 128 through the router bus 15 in accordance with the routing table 16. Thus, the transmitting and receiving unit 128 transmits the packet data through the port E (19), the inter-apparatus communication bus 31 and the port F (29) to the transmitting and receiving unit 228 of the management module 22. The transmitting and receiving unit 228 refers to the routing table 26 shown in FIG. 6B and since the destination of the received packet data is the network N, the next hop is b. Thus, the transmitting and receiving unit 228 transfers the received packet data through the router bus 25 and the transmitting and receiving unit 23*a* of the routing module 23 to the port of the address b, that is, the port B in accordance with the routing table 26. The transmitting and receiving unit 23*a* sends the packet data to the network N. Since the final destination of the packet data is the port G, the packet data is received by the terminal 42.

As described above, when a failure occurs in any of the port A, the routing module 13 and the route between the routing module 13 and the network N of the router 11, the packet data from the terminal 42 to the terminal 52 is transmitted from the port G through the ports B and D to the port H and the packet data from the terminal 52 to the terminal 42 is transmitted from the port H through the ports C, E, F and B to the port G.

When the foregoing description is summarized, communication between the terminals 42 and 52 is restored by the following procedure in the embodiment when a failure occurs in the port A (17).

(1) The management module 12 of the router 11 detects the failure of the port A.

(2) The management module 12 of the router 11 notifies the failure of the port A to the management module 22 of the router 21 through the inter-apparatus communication bus 31.

(3) The management module 22 of the router 21 changes the IP address of the port B corresponding to the port A from the inherent address b to the relay address x.

(4) The route from the terminal 42 to the terminal 52 is restored by the above processes (1) to (3). In other words, the route from the terminal 42 to the terminal 52 is restored in the state where the relay address as viewed from the terminal 42 is x as it is.

(5) The routing protocol processing units 124 and 224 of the routers 11 and 21 update the contents of the routing tables 16 and 26 as shown in FIGS. 6A and 6B, respectively.

(6) The route from the terminal 52 to the terminal 42 is restored by the process of (5).

Communication between the terminals 42 and 52 is restored by the series of processes described above. When a bridge or the like described later is used instead of the router, the process of (5) is not required.

After completion of the above processes, the failure restoration process of the port A is performed, while at this time the management module 12 of the router 11 changes the IP address of the port A from the relay address x to the inherent address a with reference to the information of the definition information memory unit 122. Thus, the port A becomes a standby port after restoration of the failure.

Further, the routing protocol processing unit 124 changes the next hop for the network N in the routing table 16 from e to a.

In addition, the management unit 120 rewrites the data 122A for the port A of the definition information memory unit 122 to the data indicating that the port A is the standby port, for example "0". Similarly, the management unit 220 rewrites the data 222B for the port B of the definition information memory unit 222 to the data "1" indicating that the port B is the current port.

The above process is identical even for the case where a failure occurs in any of the port A, the routing module 13 and the route between the port A and the network N.

The case where a failure occurs in the port C of the router 11 serving as the current system is now described with reference to FIGS. 7, 8 and 11.

Figure 7:
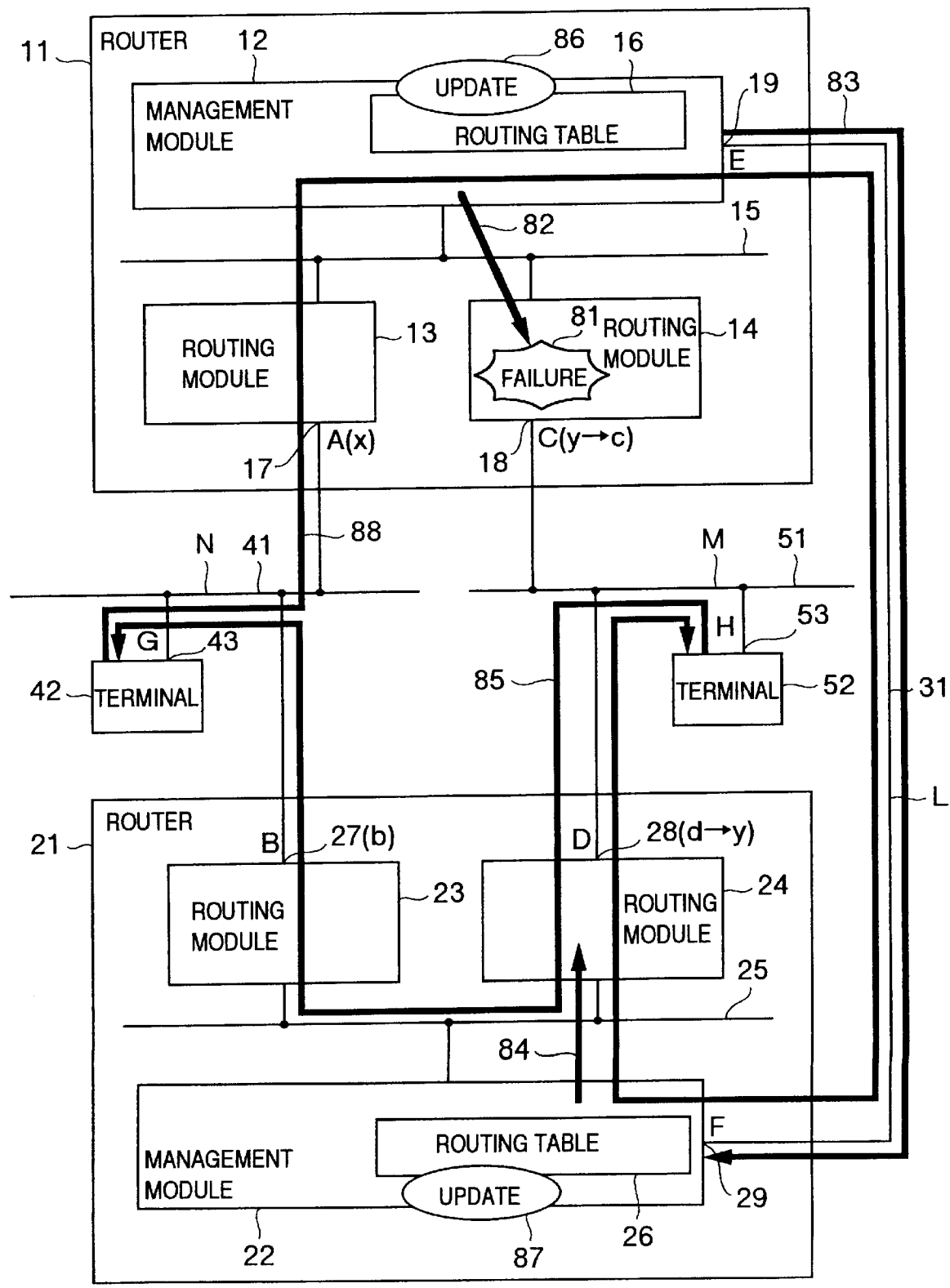
FIG. 7 shows a route of communication data in case where a failure occurs in a current port C in the network system of FIGS. 1A and 1B.

FIG. 7 shows a procedure of changing a route when a failure occurs in the port C and shows occurrence of a failure 81 in the port C (18) of the routing module 14 of the router 11 connected to the network M (51). Numeral 82 represents that the management module 12 of the router 11 detects the failure 81 of the port C (18). Numeral 83 represents that the management module 12 of the router 11 notifies the failure 81 of the port C (18) to the management module 22 of the router 21 through the inter-apparatus communication bus 31. Numeral 84 represents that the management module 22 of the router 21 changes the IP address of the port D (28) of the routing module 24 of the router 22 connected to the network M (51). Numeral 85 represents the route from the terminal 52 to the terminal 42. Numeral 86 represents that the routing protocol included in the management module 12 of the router 11 updates the routing table 16. Numeral 87 represents that the routing protocol included in the management module 22 of the router 21 updates the routing table 26. Numeral 88 represents the route from the terminal 42 to the terminal 52.

FIGS. 8A and 8B show the contents of the routing table after the route has been changed due to occurrence of the failure in the port C. FIG. 8A shows the contents of the routing table 16 prepared by the management module 12 of the router 11 and FIG. 8B shows the contents of the routing table 26 prepared by the management module 22 of the router 21.

Referring not to FIGS. 1A, 1B and 11, the process performed upon occurrence of a failure in the port C (18) is described.

In the normal communication in which any failure does not occur, the communication is performed as shown in FIG. 3 (step 301). When a failure occurs in the port C of the router 11 in this state, the communication between the terminals 42 and 52 is stopped (step 302). The failure detection unit 121 detects the failure in the port C of the routing module 13 and sends the failure notification S2 to the management unit 120. When the management unit 120 recognizes in accordance with the notification S1 that the failure occurrence portion is the port C (step 303), the management unit 120 supplies the indication of stopping the function of the port C which is the failure portion or the indication of disconnecting the port C to the routing module control unit 123. The routing module control unit 123 stops the function of the indicated port C or disconnects the port C from the network M in accordance with the function stop indication from the management unit 120.

Further, the management unit 120 refers to the information of the definition information memory unit 122 shown in FIG. 2A in response to the failure notification S1 from the failure detection unit 121 and examines whether there is provided the standby system or not. In this case, since there is provided the standby system, the failure notification indication S2 of notifying "the effect that the failure occurs in the port C" to the router 21 provided as the standby system is supplied to the failure notification transmission unit 127. When the failure notification transmission unit 127 supplies the failure notification transmission request S3 to the transmitting and receiving unit 128 in response to the failure notification indication S2 from the management unit 120, the transmitting and receiving unit 128 transmits the failure notification S4 of notifying "the effect that the failure occurs in the port C" to the router 21 provided as the standby system through the inter-apparatus communication bus 31 (step 304).

Further, the management unit 120 recognizes that the failure occurrence portion is only the port C (step 305) and the process proceeds to step 306. The transmitting and receiving unit 228 of the router 21 receives the failure notification S4 transmitted from the router 11 through the inter-apparatus communication bus 31 and the failure notification S4 is supplied from the failure notification receiving unit 226 to the management unit 220. The management unit 220 refers to the information of the definition information memory unit 222 (FIG. 2B) in response to the failure notification S4 from the failure notification receiving portion 226 and instructs the routing module control unit 223 to change the address of the port D of its own system (router 21) corresponding to the port C where the failure occurs. That is, the management unit 220 instructs the routing module control unit 223 to change the IP address of the port D from the inherent address d to the relay (common) address y (step 308).

As described above, by changing the IP address of the port D connected through the network M to the port C where the failure occurs, the route from the terminal 52 to the terminal 42 is restored (step 309).

Further, the management unit 120 notifies the change of state of the port C, that is, the malfunction of the port A to the routing protocol processing unit 124 in response to the failure notification S1 from the failure detection unit 121. The routing protocol processing unit 124 updates the contents of the routing table 16 in response to the notification (step 310). In other words, as shown in FIG. 8A, in the router 11, when the destination is the network M, the port C is stopped and accordingly the next hop is changed from c to e.

On the other hand, the management unit 220 notifies the change of the IP address of the port C to the routing protocol processing unit 224 in response to the failure notification S4 from the failure detection unit 221. The routing protocol processing unit 224 updates the contents of the routing table 26 in response to the notification (step 310). In other words, as shown in FIG. 8B, in the router 21, when the destination is the network M, the next relay port is the port having the address y, that is, the port D. Accordingly, the next hop for the network M is changed from d to y.

As described above, the mutual route between the terminals 42 and 52 is restored (step 312), so that communication between the terminals 42 and 52 is restored to thereby return to the normal communication state (step 313).

More particularly, the communication between the terminals 42 and 52 is made through the following route.

First, data communication from the terminal 52 to the terminal 42 is described with reference to FIGS. 1A, 1B and 7. The destination of the packet data from the terminal 52 (port H) is the terminal 42 (port G) (network N) and the destination address of the routing module to be relayed is y in the same manner as in the normal state.

In this case, as described above, the port C is stopped or disconnected due to occurrence of failure and the IP address of the port D is changed from d to y. Accordingly, the packet data from the terminal 52 is received by the port D of the routing module 24 having the IP address of y. The transmitting and receiving unit 24a of the routing module 24 refers to the routing table 26 shown in FIG. 8B and since the destination of the received packet data is the network N, the next hop is b. The transmitting and receiving unit 24a transfers the received packet data to the port having the address b, that is, the port B through the router bus 25 and the transmitting and receiving unit 23a of the routing module 23 in accordance with the routing table 26. The transmitting and receiving unit 23a sends the packet data to the network N. Since the final destination of the packet data is the port G, the packet data is received by the terminal 42.

On the other hand, data communication from the terminal 42 to the terminal 52 is now described. The destination of the packet data from the terminal 42 (port G) is the terminal 52 (port H) (network M) and the destination address of the routing module to be relayed is x in the same manner as in the normal state.

In this case, as described above, since the IP address of the port A is x, the packet data from the terminal 42 is received by the port A of the routing module 13 having the IP address of x. The transmitting and receiving unit 13a of the routing module 13 refers to the routing table 16 shown in FIG. 8A and since the destination of the received packet data is the network M, the next hop is e. Since the destination of the received packet data is the network M, the transmitting and receiving unit 13a sends the received packet data to the transmitting and receiving unit 128 through the router bus 15 in accordance with the routing table 16. Thus, the transmitting and receiving unit 128 transmits the packet data through the port E (19), the inter-apparatus communication bus 31 and the port F (29) to the transmitting and receiving unit 228 of the management module 22. The transmitting and receiving unit 228 refers to the routing table 26 shown in FIG. 7B and since the destination of the received packet data is the network M, the next hop is d. Thus, the transmitting and receiving unit 228 transfers the received packet data through the router bus 25 and the transmitting and receiving unit 24a of the routing module 24 to the port of the address d, that is, the port D in accordance with the routing table 26. The transmitting and receiving unit 24a sends the packet data to the network M. Since the final destination of the packet data is the port H, the packet data is received by the terminal 52.

As described above, when a failure occurs in any of the port C, the routing module 14 and the route between the routing module 14 and the network M of the router 11, the packet data from the terminal 42 to the terminal 52 is transmitted from the port G through the ports A, E, F and D to the port H and the packet data from the terminal 52 to the terminal 42 is transmitted from the port H through the ports D and B to the port G.

When the foregoing description is summarized, communication between the terminals 42 and 52 is restored by the following procedure in the embodiment when a failure occurs in the port C (18).

(1) The management module 12 of the router 11 detects the failure of the port C.

(2) The management module 12 of the router 11 notifies the failure of the port C to the management module 22 of the router 21 through the inter-apparatus communication bus 31.

(3) The management module 22 of the router 21 changes the IP address of the port D corresponding to the port C from the inherent address d to the relay address y.

(4) The route from the terminal 52 to the terminal 42 is restored by the above processes (1) to (3). In other words, the route from the terminal 52 to the terminal 42 is restored in the state where the relay address as viewed from the terminal 52 is y as it is.

(5) The routing protocol processing units 124 and 224 of the routers 11 and 21 update the contents of the routing tables 16 and 26 as shown in FIGS. 8A and 8B, respectively.

(6) The route from the terminal 42 to the terminal 52 is restored by the process of (5).

Communication between the terminals 42 and 52 is restored by the series of processes described above. Further, in the same manner as the above, when a bridge or the like described later is used instead of the router, the process of (5) is not required.

The above process is identical even for the case where a failure occurs in any of the port C, the routing module 14 and the route between the port C and the network 51.

After completion of the process, the failure restoration process of the port C is performed and the IP address of the port C is changed from the relay address y to the inherent address c. Thus, the port C is thereafter set to the standby port.

Further, the routing protocol processing unit 24 changes the next hop for the network M in the routing table 16 from e to c.

In addition, the management unit 120 rewrites the data 122c for the port C in the definition information memory unit 122 to data "0" indicating that the port is a standby port and rewrites the data 222D for the port D in the definition information memory unit 222 to data "1" indicating that the port is a current port.

As described above, even if a failure occurs in any portion of a port, a routing module including the port and a route between the port and a pertinent network of the router 11 of the current system, only the port corresponding to the failed portion is stopped or is electrically disconnected from the pertinent network and the normal ports of the current system are operated as they are. At the same time, the address of the port of the standby system corresponding to the failed port is changed to the address of the failed port. Thus, the communication between the terminals 42 and 52 can be continued while change of the transmission route of the packet data is minimized. In other words, even if a failure occurs in a certain portion of the current router 11, it is not necessary to change the whole of the current system to the standby system as in the prior art and the route corresponding to only the failed portion is changed. It is not necessary to change routes corresponding to the normal portions of the current system.

Further, the relay address of the packet data from the terminal is not required to be changed and the route is automatically changed so that the packet data is transmitted to the terminal of the destination. In other words, the relay address of the packet data from the terminal 42 is not changed to be x as it is and the route is automatically changed so that the packet data is transmitted to the terminal 52.

Similarly, the relay address of the packet data from the terminal 52 is not changed to be y as it is and the route is automatically changed so that the packet data is transmitted to the terminal 42. In other words, since the packet data from the terminal is automatically transmitted to the terminal of the destination without change of the relay address of the packet data, communication can be attained without considering change of the communication route in the terminal.

The case where failures occur in both of the ports A (17) and C (18) is now described with reference to FIGS. 9, 10 and 11.

Figure 9:
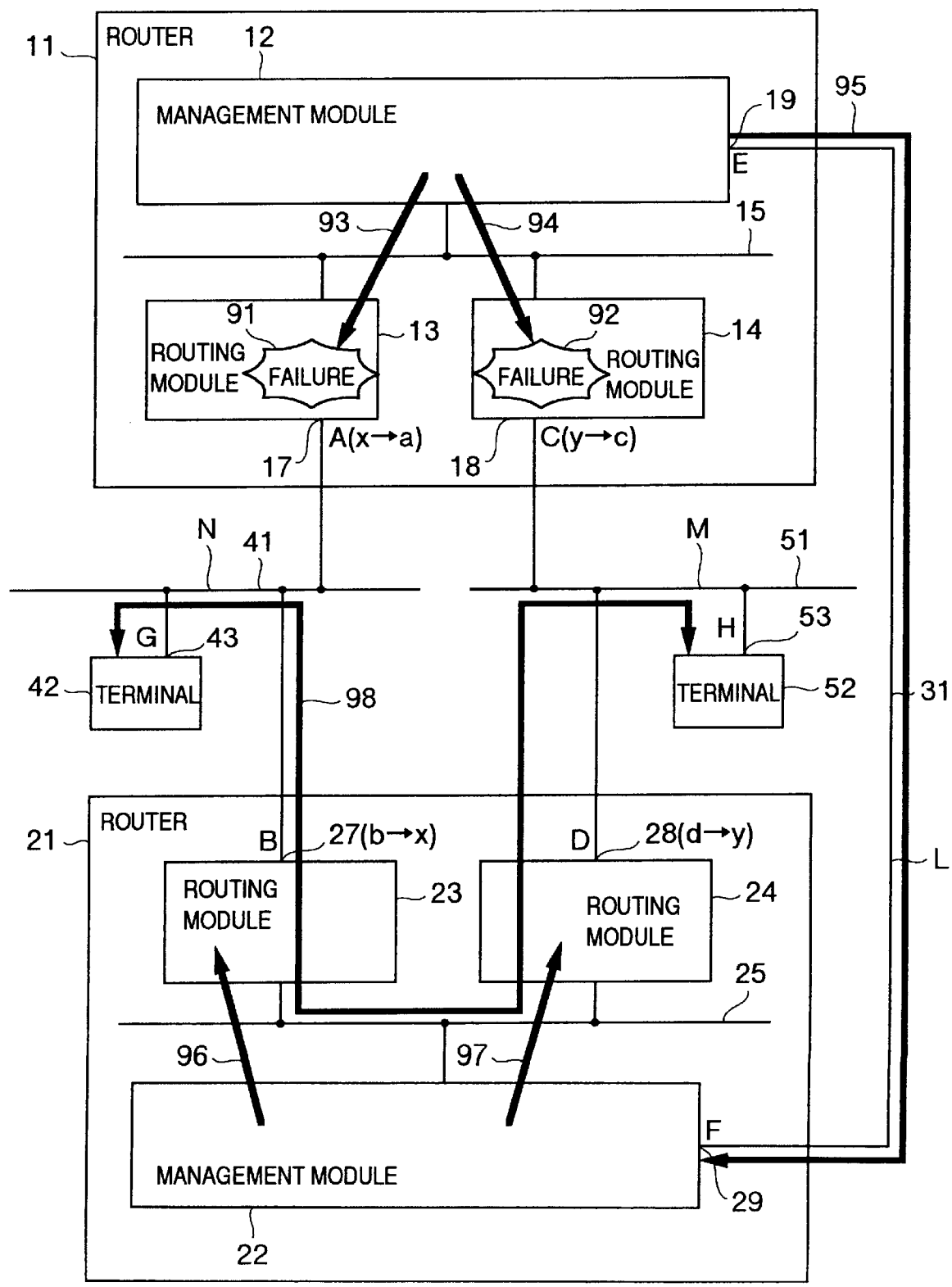
FIG. 9 shows a route of communication data in case where a failure occurs in the current ports A and C in the network system of FIGS. 1A and 1B.

FIG. 9 shows a procedure of changing a route when failures occur in both of the ports A (17) and C (18) and shows a failure 91 occurring in the port A (17) of the routing module 13 of the router 11 connected to the network N (41) and a failure 92 occurring in the port C (18) of the routing module 14 of the router 11 connected to the network M (51). Numeral 93 represents that the management module 12 of the router 11 detects the failure 91 of the port A (17). Numeral 94 represents that the management module 12 of the router 11 detects the failure 92 of the port C (18). Numeral 95 represents that the management module 12 of the router 11 notifies the failures 91 and 92 of the ports A (17) and C (18) to the management module 22 of the router 21 through the inter-apparatus communication bus 31. Numeral 96 represents that the management module 22 of the router 21 changes the IP address of the port B (27) of the routing module 23 connected to the network 41. Numeral 97 represents that the management module 22 of the router 21 changes the IP address of the port D (28) of the routing module 24 connected to the network 51. Numeral 98 represents a route from the terminal 42 to the terminal 52.

FIGS. 10A and 10B show the contents of the routing table having routes changed due to occurrence of the failures in the ports A (17) and C (18). FIG. 10A shows the contents of the routing table 16 prepared by the management module 12 of the router 11 and FIG. 10B shows the contents of the routing table 26 prepared by the management module 22 of the router 21.

Referring now to FIGS. 1A, 1B and 11, the process performed upon occurrence of failures in the ports A (17) and C (18) is described.

In the normal communication state where no failure occurs, communication is performed as shown in FIG. 3 (step 301). When failures occurs in the ports A and C of the router 11 in this state, the communication between the terminals 42 and 52 is stopped (step 302). The failure detection unit 121 detects the failures in the ports A and C of the routing modules 13 and 14 and sends the failure notification S1 to the management unit 120. The management unit 120 recognizes the failure detection portions which are the ports A and C in accordance with the notification S1 (step 303) and supplies the indication of stopping the function of (or disconnecting) the ports A and C which are the failed portions to the routing module control unit 123. The routing module control unit 123 stops the function of the indicated ports A and C or disconnects the ports A and C from the networks N and M in accordance with the function stop indication from the management unit 120, respectively.

Further, the management unit 120 refers to the information of the definition information memory unit 122 shown in FIG. 2A in response to the failure notification S1 from the failure detection unit 121 and examines whether the standby system is provided or not. In this case, since the standby system is provided, the management unit 120 supplies to the failure notification transmitting unit 127 the failure notification indication S2 for notifying "the effect that the failures occur in the ports A and C" to the standby router 21. When the failure notification transmitting unit 127 supplies the failure notification transmission request S3 to the transmitting and receiving unit 128 in response to the failure notification indication S2 from the management unit 120, the transmitting and receiving unit 128 sends the failure notification S4 for notifying "the effect that the failures occur in the ports A and C" to the standby router 21 through the inter-apparatus communication bus 31 (step 304).

Further, the management unit 120 recognizes that the failure occurrence portions are the ports A and C (step 305) and the process proceeds to step 311. The transmitting and receiving unit 228 of the router 21 receives the failure notification S4 transmitted from the router 11 through the inter-apparatus communication bus 31 and the failure notification S4 is supplied from the failure notification receiving unit 226 to the management unit 220. The management unit 220 refers to the information of the definition information memory unit 222 (FIG. 2B) in response to the failure notification S4 from the failure notification receiving unit 226 and instructs the routing module control unit 223 to change the address of the ports B and D of its own system (router 21) corresponding to the ports A and C where the failures occur. In other words, the management unit 220 instructs the routing module control unit 223 to change the IP addresses of the ports B and D from the inherent addresses b and d to the relay (common) addresses x and y, respectively (step 311).

As described above, by changing the IP addresses of the ports B and D connected to the ports A and C where the failures occur, the route from the terminal 52 to the terminal 42 and the route from the terminal 42 to the terminal 52 are restored (step 312) and the communication state between the terminals 42 and 52 is returned to the normal communication state (step 313).

On the other hand, the management unit 220 notifies the change of the addresses of the ports A and C to the routing protocol processing unit 224 in response to the failure notification S4 from the failure detection unit 221. The routing protocol processing unit 224 updates the contents of the routing table 26 in response to the notification (step 310). In other words, as shown in FIG. 10B, in the router 21, when the destination is the network N, the next relay port is the port having the address x, that is, the port B. Accordingly, the next hop for the network N is changed from b to x. Similarly, when the destination is the network M, the next relay port is the port having the address y, that is, the port D. Accordingly, the next hop for the network M is changed from d to y. When the destination is the network L, the next hop is f as it is.

More particularly, the communication between the terminals 42 to 52 is performed through the following route.

First, data communication from the terminal 42 to the terminal 52 is described with reference to FIGS. 1 and 9. The destination of the packet data from the terminal 42 (port G) is the terminal 52 (port H) (network M) and the destination address of the routing module to be relayed is x in the same manner as in the normal state.

In this case, as described above, the port A is stopped or disconnected due to occurrence of failure and the IP address of the port B is changed from b to x. Accordingly, the packet data from the terminal 42 is received by the port B of the routing module 23 having the IP address of x. The transmitting and receiving unit 23a of the routing module 23 refers to the routing table 26 shown in FIG. 10B and since the destination of the received packet data is the network M, the next hop is y. The transmitting and receiving unit 23a transfers the received packet data to the port having the address y, that is, the port D through the router bus 25 and the transmitting and receiving unit 24a of the routing module 24 in accordance with the routing table 26. The transmitting and receiving unit 24a sends the packet data to the network M. Since the final destination of the packet data is the port H, the packet data is received by the terminal 52.

Similarly, data communication from the terminal 52 to the terminal 42 is now described. The destination of the packet data from the terminal 52 (port H) is the terminal 42 (port G) (network N) and the destination address of the routing module to be relayed is y in the same manner as in the normal state.

In this case, as described above, the port C is stopped or disconnected due to occurrence of failure. Accordingly, the packet data from the terminal 52 is received by the port D of the routing module 24 having the IP address of y. The transmitting and receiving unit 24a of the routing module 24 refers to the routing table 26 shown in FIG. 10B and since the destination of the received packet data is the network N, the next hop is x. Thus, the transmitting and receiving unit 24a transfers the received packet data to the port of the address x, that is, the port B through the router bus 25 and the transmitting and receiving unit 23a of the routing module 23 in accordance with the routing table 26. The transmitting and receiving unit 23a transmits the packet data to the network N. Since the final destination of the packet data is the port G, the packet data is received by the terminal 42.

As described above, when a failure occurs in any of the port A, the routing module 13 and the route between the routing module 13 and the network N of the router 11 and a failure occurs in any of the port C, the routing module 14 and the route between the routing module 14 and the network M, the packet data from the terminal 42 to the terminal 52 is transmitted from the port G through the ports B and D to the port H and the packet data from the terminal 52 to the terminal 42 is transmitted from the port H through the ports D and B to the port G.

When the foregoing description is summarized, communication between the terminals 42 and 52 is restored by the following procedure in the embodiment when failures occur in the port A (17) and the port C (18).

(1) The management module 12 of the router 11 detects the failures of the ports A and C.

(2) The management module 12 of the router 11 notifies the failure of the ports A and C to the management module 22 of the router 21 through the inter-apparatus communication bus 31.

(3) The management module 22 of the router 21 changes the IP addresses of the ports B and D to the relay IP addresses x and y.

(4) The route from the terminal 42 to the terminal 52 and the route from the terminal 52 to the terminal 42 are restored by the above processes (1) to (3).

The communication between the terminals 42 and 52 is restored by the series of operations as described above.

(5) The routing protocol processing units 124 and 224 of the routers 11 and 21 update the contents of the routing tables 16 and 26 as shown in FIGS. 10A and 10B, respectively.

In the same manner as described above, when a bridge or the like described later is used instead of the router, the process of (5) is not required.

The above processes are identical even for the case where a failure occurs in any of the port A, the routing module 13 and the route between the port A and the network 41 and a failure occurs in any of the port C, the routing module 14 and the route between the port C and the network 51.

After completion of the above processes, the failure restoration process of the ports A and C is performed, while at this time the management module 12 of the router 11 changes the IP addresses of the ports A and C from the relay addresses x and y to the inherent addresses a and c with reference to the information of the definition information memory unit 122. Thus, the ports A and c become the standby ports after restoration of the failures.

Further, the routing protocol processing unit 124 changes the next hops for the networks N and M in the routing table 16 from e to a and c, respectively.

In addition, the management unit 120 rewrites the data 122A and 122C for the ports A and C of the definition information memory unit 122 to the data "0" indicating that the ports A and C are the standby ports. Similarly, the management unit 220 rewrites the data 222B and 222D for the ports B and D of the definition information memory unit 222 to the data "1" indicating that the ports B and D are the current ports.

In any cases of FIGS. 5, 7 and 9, the IP addresses of the port I of the routing module 13 and the port J of the routing module 23 connected to the network P are not changed.

Further, in any cases of FIGS. 5, 7 and 9, the processes performed upon occurrence of failure between the networks N and M are described, while when failure occurs between the networks P and M of FIGS. 1A and 1B, the same processes are also performed.

As described above, when a failure occurs in each port of the router 11, the IP addresses of the current port where the failure occurs and the pertinent standby port of the router can be changed to thereby restore the communication route between the terminals connected to the networks.

A second embodiment in which an IP address is not set to the port of the standby system in the network system shown in FIGS. 1A and 1B is now described.

Figure 12:
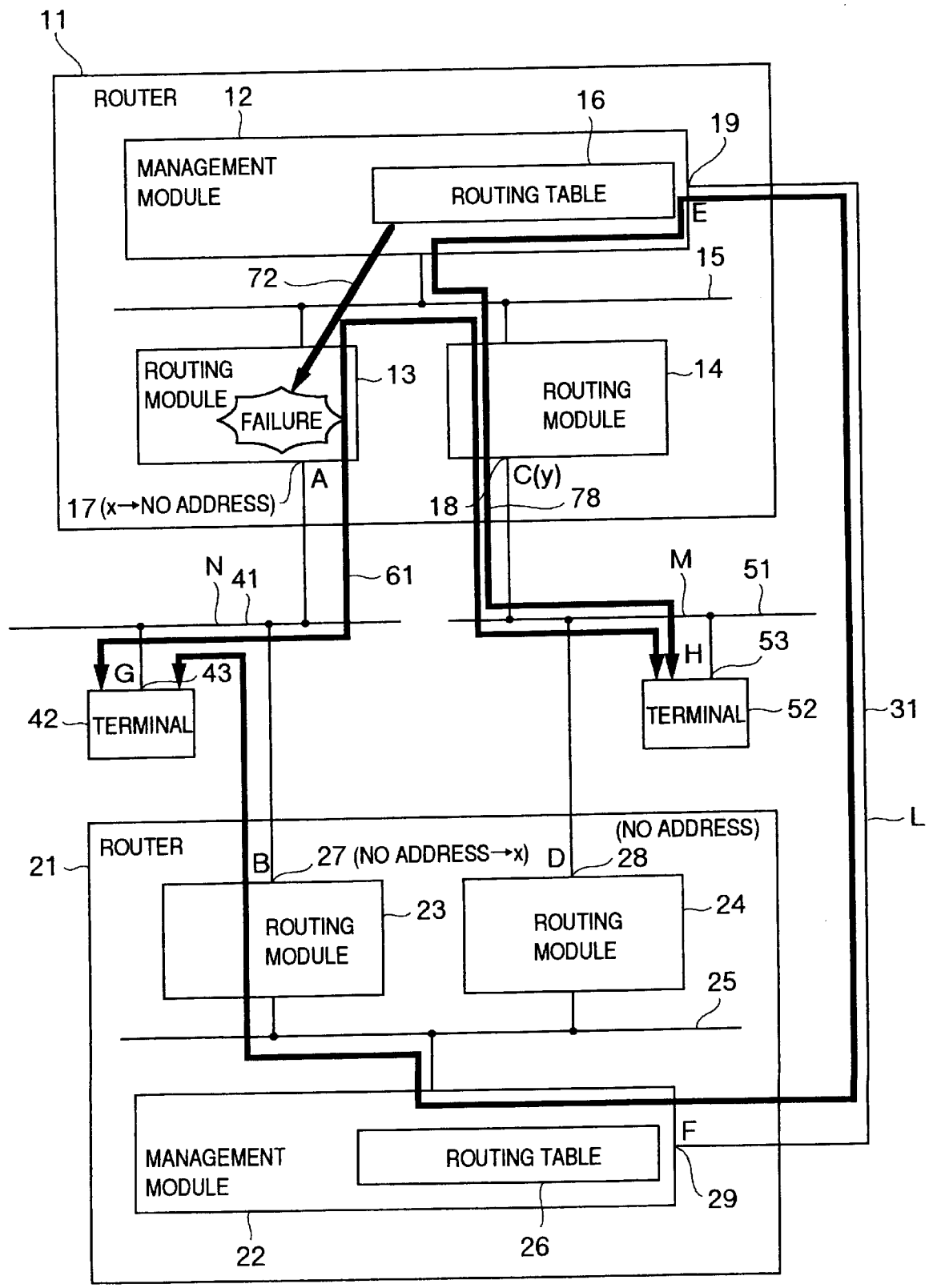
FIG. 12 shows a route of communication data in case where a failure occurs in the current port in a second embodiment of a network system according to the present invention.

FIG. 12 is a block diagram schematically illustrating the network system of the second embodiment, in which the configuration of each block is the same as that of FIGS. 1A and 1B.

In the embodiment, the IP addresses x and y are set in the ports A and C of the current system, respectively, and the IP address is not set in the ports B and D of the standby system. Further, e and f are set as the IP addresses of the ports E and F, respectively. The port in which the IP address is not set is the port which cannot perform communication. Accordingly, in the embodiment, the ports B and D of the standby system cannot perform communication in principle.

The embodiment in which the IP address is not set in the ports of the standby system is featured in that consumption or use of the IP address is small.

In the embodiment, in the normal state in which no failure occurs in the router 11 of the current system, communication is performed in the same manner as the first embodiment, that is, through the same route 61 a s in FIG. 3.

Changing operation of a route for communication data when a failure occurs in the network system is now described.

In the embodiment, the case where a failure occurs in the port A of the router 11 of the current system is described by way of example with reference to FIGS. 1A, 1B, 12, 13A and 13B.

(1) The management module 12 of the router 11 first detects a failure of the port A.

(2) The management module 12 of the router 11 notifies the failure of the port A to the management module 22 of the router 21 through the inter-apparatus communication bus 31.

(3) The management module 12 of the router 11 stops operation of the port A1 of the routing module 13. The management module 22 of the router 21 changes the IP address of the port B corresponding to the port A from "no address" to the relay address x.

Accordingly, the port B is changed to the current port, that is, the transmittable port.

(4) The routing protocol processing units 124 and 224 of the routers 11 and 21 update the contents of the routing tables 16 and 26 as shown in FIGS. 13A and 13B, respectively.

More particularly, as shown in FIG. 13A, in the router 11, when the destination is the network N, the next relay port is the port having the address e, that is, the port E. Accordingly, the next hop for the network N is changed from x to e.

On the other hand, as shown in FIG. 13B, in the router 21, when the destination is the network N, the next relay port is the port having the address x, that is, the port B. Accordingly, the next hop is changed from "no address" to x. When the destination is the network M, the next relay port is the port of the routing module 24 and the address of the port D thereof is "no address". Accordingly, since communication through the port D is impossible, the next hop is left to be the IP address f of the port F.

(5) The route from the terminal 42 to the terminal 52 and the route from the terminal 52 to the terminal 42 are restored by the above processes (1) to (4).

In other words, the route from the terminal 42 to the terminal 52 is restored in the state where the relay address as viewed from the terminal 42 is x as it is and the route from the terminal 52 to the terminal 42 is restored in the state where the relay address as viewed from the terminal 52 is y as it is.

Further, when the bridge or the like described later is used instead of the router, the process of (4) is not required.

Thus, when a failure occurs in the port A of the router 11, the packet data from the terminal 42 to the terminal 52 is transmitted from the port G through the ports B, F, E and C to the port H and the packet data from the terminal 52 to the terminal 42 is transmitted from the port H through the ports C, E, F and B to the port G as shown by the route 78 of FIG. 12.

Even when failure occurs in the port C or the ports A and C, the communication route is changed similarly and the communication is restored.

The above processes are identical even for the case where failure occurs in any of the port A, the routing module 13 and the route between the port A and the network N.

A third embodiment in which in case where at least one routing module of the router of the current system in the network system shown in FIGS. 1A and 1B includes a plurality of ports, all ports, that is, all ports including ports being operated normally, of the at least one routing module are changed from the current system to the standby system when a failure occurs in one port of the at least one routing module is now described.

Figure 14:
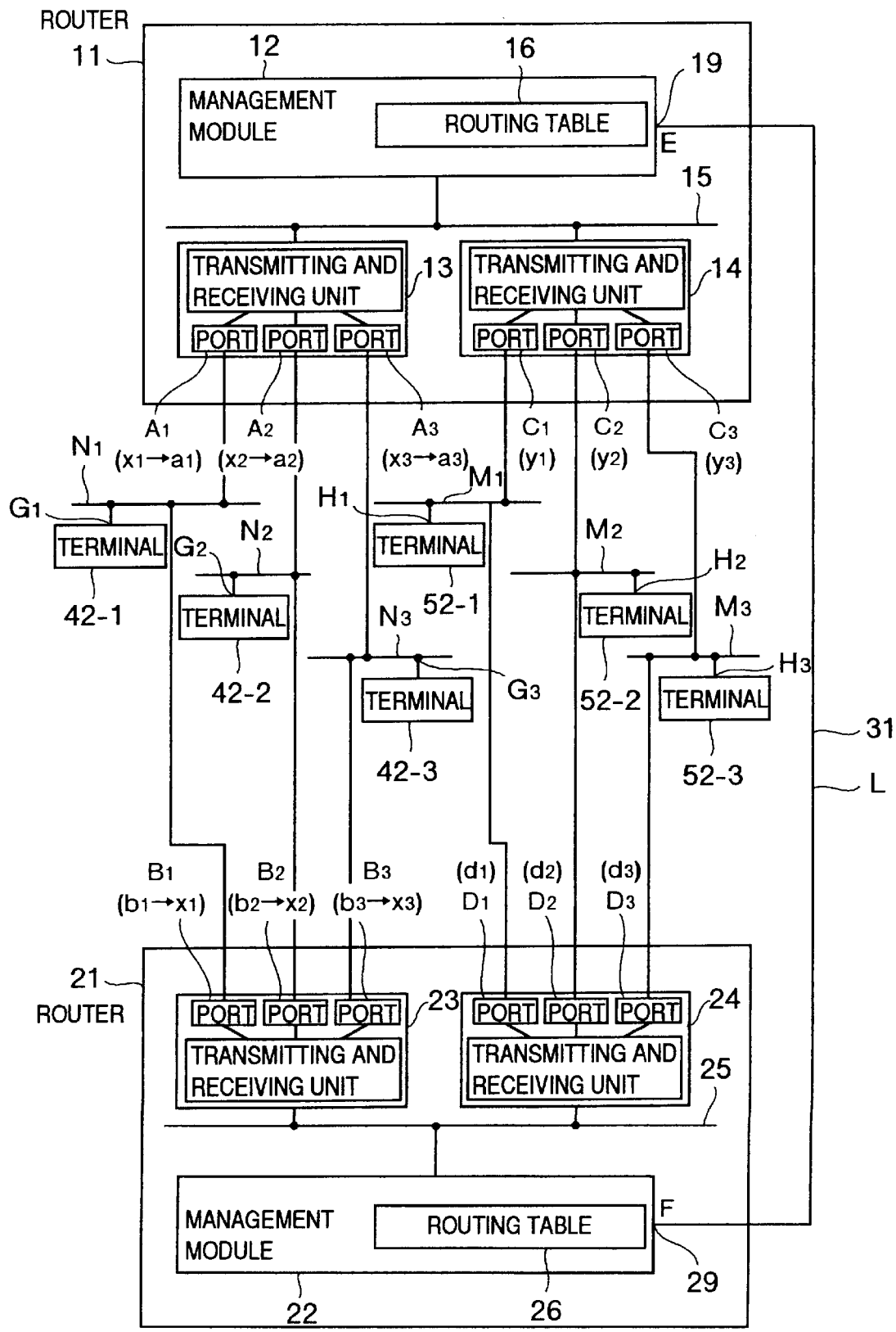
FIG. 14 is a block diagram schematically illustrating a third embodiment of a network system according to the present invention.

FIG. 14 is a block diagram schematically illustrating a network system of the third embodiment, in which the configuration of each block is the same as that of FIGS. 1A and 1B except that each routing module includes a plurality of ports.

In FIG. 14, the router 11 includes two routing modules 13 and 14. The routing module 13 includes three ports A1, A2 and A3 and the routing module 14 includes three ports C1, C2 and C3. The port A1 is connected through a network N1 to a terminal 42-1 having a port G1, the port A2 is connected through a network N2 to a terminal 42-2 having a port G2, and the port A3 is connected through a network N3 to a terminal 42-3 having a port G3. The port C1 is connected through a network M1 to a terminal 52-1 having a port H1, the port C2 is connected through a network M2 to a terminal 52-2 having a port H2, and the port C3 is connected through a network M3 to a terminal 52-3 having a port H3.

The router 21 includes two routing modules 23 and 24. The routing module 23 includes three ports B1, B2 and B3 and the routing module 24 includes three ports D1, D2 and D3. The port B1 is connected through the network N1 to the terminal 42-1 having the port G1, the port B2 is connected through the network N2 to the terminal 42-2 having the port G2, and the port B3 is connected through the network N3 to a terminal 42-3 having the port G3. The port D1 is connected through the network M1 to the terminal 52-1 having the port H1, the port D2 is connected through the network M2 to the terminal 52-2 having the port H2, and the port D3 is connected through the network M3 to the terminal 52-3 having the port H3.

In the embodiment, each of the routers 11 and 12 includes two routing modules and each of the routing modules includes three ports by way of example, while the embodiment can be applied to the case where each of the routers 11 and 21 includes three or more routing modules and each of the routing modules includes two or more ports.

The IP addresses of the ports used in the embodiment are defined as follows:

x1 is an IP address common to ports A1 and B1.
x2 is an IP address common to ports A2 and B2.
x3 is an IP address common to ports A3 and B3.
a1 is an IP address inherent to port A1.
a2 is an IP address inherent to port A2.
a3 is an IP address inherent to port A3.
b1 is an IP address inherent to port B1.
b2 is an IP address inherent to port B2.
b3 is an IP address inherent to port B3.
y1 is an IP address common to ports C1 and D1.
y2 is an IP address common to ports C2 and D2.
y3 is an IP address common to ports C3 and D3.
c1 is an IP address inherent to port C1.
c2 is an IP address inherent to port C2.
c3 is an IP address inherent to port C3.
d1 is an IP address inherent to port D1.
d2 is an IP address inherent to port D2.
d3 is an IP address inherent to port D3.
e is an IP address inherent to port E.
f is an IP address inherent to port F.

In the embodiment, the IP addresses of the ports when the router 11 of the current system is normally operated are as follows:

The IP address of the port A1 is x1.
The IP address of the port A2 is x2.
The IP address of the port A3 is x3.
The IP address of the port B1 is b1.
The IP address of the port B2 is b2.
The IP address of the port B3 is b3.
The IP address of the port C1 is y1.
The IP address of the port C2 is y2.
The IP address of the port C3 is y3.
The IP address of the port D1 is d1.
The IP address of the port D2 is d2.
The IP address of the port D3 is d3.
The IP address of the port E is e.
The IP address of the port F is f.

When the router 11 is operated normally, the packet data is transferred through the following route. That is, the packet data from the terminal 42-1 to the terminal 52-1 is transmitted from the port G1 through the ports A1 and C1 to the port H1 and the packet data from the terminal 52-1 to the terminal 42-1 is transmitted from the port H1 through the ports C1 and A1 to the port G1.

Similarly, the packet data from the terminal 42-2 to the terminal 52-2 is transmitted from the port G2 through the ports A2 and C2 to the port H2 and the packet data from the terminal 52-2 to the terminal 42-2 is transmitted from the port H2 through the ports C2 and A2 to the port G2.

Similarly, the packet data from the terminal 42-3 to the terminal 52-3 is transmitted from the port G3 through the ports A3 and C3 to the port H3 and the packet data from the terminal 52-3 to the terminal 42-3 is transmitted from the port H3 through the ports C3 and A3 to the port G3.

Changing operation of a route of communication data in case where a failure occurs in the network system is now described.

The case where a failure occurs in the port A1 of the router 11 of the current system is described by way of example with reference to FIGS. 14, 15A, 15B, 16A and 16B.

(1) The management module 12 of the router 11 first detects the failure of the port A1.

(2) The management module 12 of the router 11 notifies the failure of the port A1 to the management module 22 of the router 21 through the inter-apparatus communication bus 31.

(3) The management module 12 of the router 11 stops operation of the routing module 13 including the port A1 where the failure occurs.

The management module 22 of the router 21 changes the IP addresses of the ports B1, B2 and B3 corresponding to the ports A1, A2 and A3 from the inherent addresses b1, b2 and b3 to the relay addresses x1, x2 and x3, respectively.

Accordingly, all of the ports A1, A2 and A3 of the routing module 13 become the ports which cannot communicate and the ports B1, B2 and B3 of the routing module 23 become current ports.

(4) The routing protocol processing units 124 and 224 of the routers 11 and 21 update the contents of the routing tables 16 and 26 from the states shown in FIGS. 15A and 15B to the states shown in FIGS. 16A and 16B, respectively. FIGS. 15A and 15B show the contents of the routing table 16 and 26 when the router 11 is in the normal state and FIGS. 16A and 16B show the contents of the routing tables 16 and 26 after the route is changed due to occurrence of failure in the port A1.

(5) The route from the terminal 42-1 to the terminal 52-1 and the route from the terminal 52-1 to the terminal 42-1 are restored by the above processes of (1) to (4).

In other words, the route from the terminal 42-1 to the terminal 52-1 is restored in the state where the relay address as viewed from the terminal 42-1 is x1 as it is and the route from the terminal 52-1 to the terminal 42-1 is restored in the state where the relay address as viewed from the terminal 52-1 is y1 as it is.

The route from the terminal 42-2 to the terminal 52-2, the route from the terminal 52-2 to the terminal 42-2, the route from the terminal 42-3 to the terminal 52-3, and the route from the terminal 52-3 to the terminal 42-3 are also restored in the same manner.

Further, when the bridge or the like described later is used instead of the router, the process of (4) is not required.

As described above, when the failure occurs in the port A1 of the router 11, the packet data from the terminal 42-1 to the terminal 52-1 is transmitted from the port G1 through the ports B1, F, E and C1 to the port H1 and the packet data from the terminal 52-1 to the terminal 42-1 is transmitted from the port H1 through the ports C1, E, F and B1 to the port G1.

Similarly, the packet data from the terminal 42-2 to the terminal 52-2 is transmitted from the port G2 through the ports B2, F, E and C2 to the port H2 and the packet data from the terminal 52-2 to the terminal 42-2 is transmitted from the port H2 through the ports C2, E, F and B2 to the port G2.

Similarly, the packet data from the terminal 42-3 to the terminal 52-3 is transmitted from the port G3 through the ports B3, F, E and C3 to the port H3 and the packet data from the terminal 52-3 to the terminal 42-3 is transmitted from the port H3 through the ports C3, E, F and B3 to the port G3.

As described above, in the embodiment, the transmission routes of data to not only the port where the failure occurs but also all other ports included in the same routing module as the port are changed.

The above processes are the same even for the case where a failure occurs in any of the ports A1, A2 and A3, the routing module 13, the route between the port A1 and the network N1, the route between the port A2 and the network N2 and the route between the port A3 and the network N3.

Even when a failure occurs in any of the ports C1 to C3 or in any of the ports A1 to A3 and any of the ports C1 to C3, the communication route is changed and the communication is restored in the same manner.

After completion of the above processes of (1) to (5), the failure restoration process of the ports A1, A2 and A3 is performed and the IP addresses of the ports A1, A2 and A3 are change from the relay addresses x1, x2 and x3 to the inherent addresses a1, a2 and a3, respectively. Thus, the ports A1, A2 and A3 become the standby ports thereafter.

Further, the routing protocol processing unit 124 changes the next hops for the networks N1, N2 and N3 in the routing table 16 from e to a1, a2 and a3.

In addition, the management unit 120 rewrites the data 122A1, 122A2 and 122A3 for the ports A1, A2 and A3 of the definition information memory 122 to data "0" indicating the standby port, and the management unit 220 rewrites the data 222B1, 222B2 and 222B3 for the ports B1, B2 and B3 of the definition information memory unit 222 to data "1" indicating the current port.

A fourth embodiment including the network system having the same configuration as that of FIG. 14 in which when a failure occurs in one port of the routing module, only this port is changed from the current system to the standby system is now described.

Changing operation of a route of communication data when a failure occurs in the embodiment is described.

The case where the failure occurs in the port A1 of the router 11 of the current system by way of example is described with reference to FIGS. 14, 17A and 17B.

(1) The management module 12 of the router 11 first detects the failure of the port A1.

(2) The management module 12 of the router 11 notifies the failure of the port A1 to the management module 22 of the router 21 through the inter-apparatus communication bus 31.

(3) The management module 12 of the router 11 stops operation of the port A1 where the failure occurs.

Further, the management module 22 of the router 21 changes the IP addresses of the port B1 corresponding to the port A1 from the inherent address b1 to the relay address x1, respectively.

Accordingly, the port A1 of the routing module 13 becomes the port which cannot communicate and the port B1 of the routing module 23 becomes a current port.

(4) The routing protocol processing units 124 and 224 of the routers 11 and 21 update the contents of the routing tables 16 and 26 from the states shown in FIGS. 15A and 15B to the states shown in FIGS. 17A and 17B, respectively. FIGS. 17A and 17B show the contents of the routing tables 16 and 26 after the route is changed due to occurrence of failure in the port A1.

(5) The route from the terminal 42-1 to the terminal 52-1 and the route from the terminal 52-1 to the terminal 42-1 are restored by the above processes of (1) to (4).

In other words, the route from the terminal 42-1 to the terminal 52-1 is restored in the state where the relay address as viewed from the terminal 42-1 is x1 as it is and the route from the terminal 52-1 to the terminal 42-1 is restored in the state where the relay address as viewed from the terminal 52-1 is y1 as it is.

Further, when the bridge or the like described later is used instead of the router, the process of (4) is not required.

As described above, when the failure occurs in the port A1 of the router 11, the packet data from the terminal 42-1 to the terminal 52-1 is transmitted from the port G1 through the ports B1 and D to the port H1 and the packet data from the terminal 52-1 to the terminal 42-1 is transmitted from the port H1 through the ports C1, E, F and B1 to the port G1.

Further, the route of the packet data from the terminal 42-2 to the terminal 52-2 is the same as that in the normal state and is transmitted from the port G2 through the ports A2 and C2 to the port H2 and the packet data from the terminal 52-2 to the terminal 42-2 is transmitted from the port H2 through the ports C2 and A2 to the port G2.

Similarly, the route of the packet data from the terminal 42-3 to the terminal 52-3 is the same as that in the normal state and is transmitted from the port G3 through the ports A3 and C3 to the port H3 and the packet data from the terminal 52-3 to the terminal 42-3 is transmitted from the port H3 through the ports C3 and A3 to the port G3.

After completion of the process of (4), the failure restoration process of the port A1 is performed and at this time the management module 12 of the router 11 changes the IP address of the port A1 from the relay address x1 to the inherent address a1. Thus, the port A1 becomes the standby port after restoration of the failure.

As described above, in the embodiment, the transmission route of data of only the port where the failure occurs is changed.

The process is identical even for the case where the failure occurs in any of the port A1, the routing module 13 and the route between the port A1 and the network N1.

Further, the port A1 becomes a standby port after restoration of the failure.

Even if a failure occurs in any of the ports A2, A3, C1 to C3 or any of the ports A1 to A3 and any of the ports C1 to C3, the communication route is changed similarly, so that communication is restored.

A fifth embodiment having the function of managing the network by management information base (MIB) in the network system having the same configuration as that of FIGS. 1A and 1B in which when a failure occurs in the current system, management information managed by the MIB is collected automatically without considering the physical configuration of the route constituting the internetwork apparatus, that is, without considering change of a route due to occurrence of failure is now described.

Figure 18A:
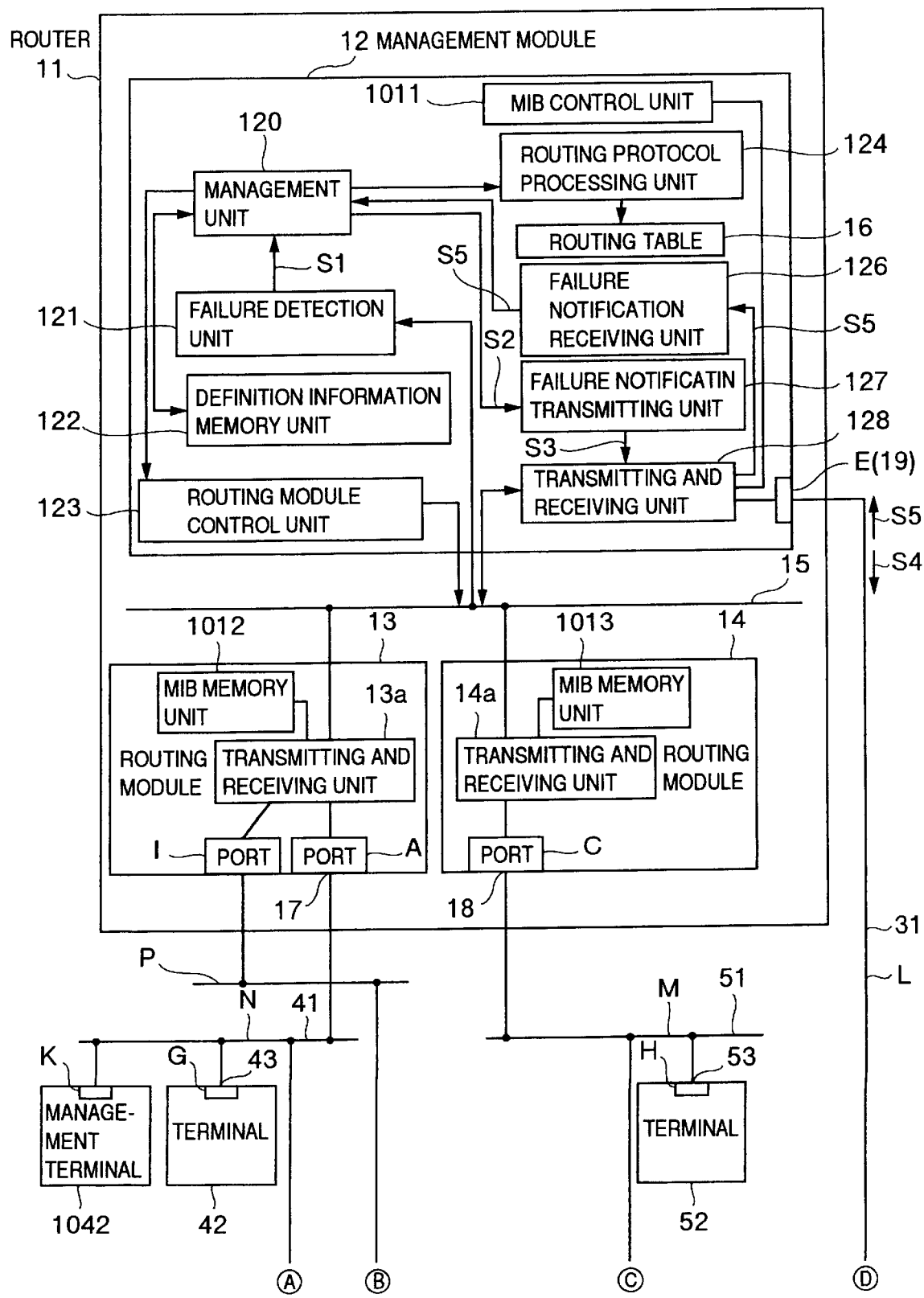
FIGS. 18A and 18B are block diagrams schematically illustrating a fifth embodiment of a network system according to the present invention.
Figure 18B:
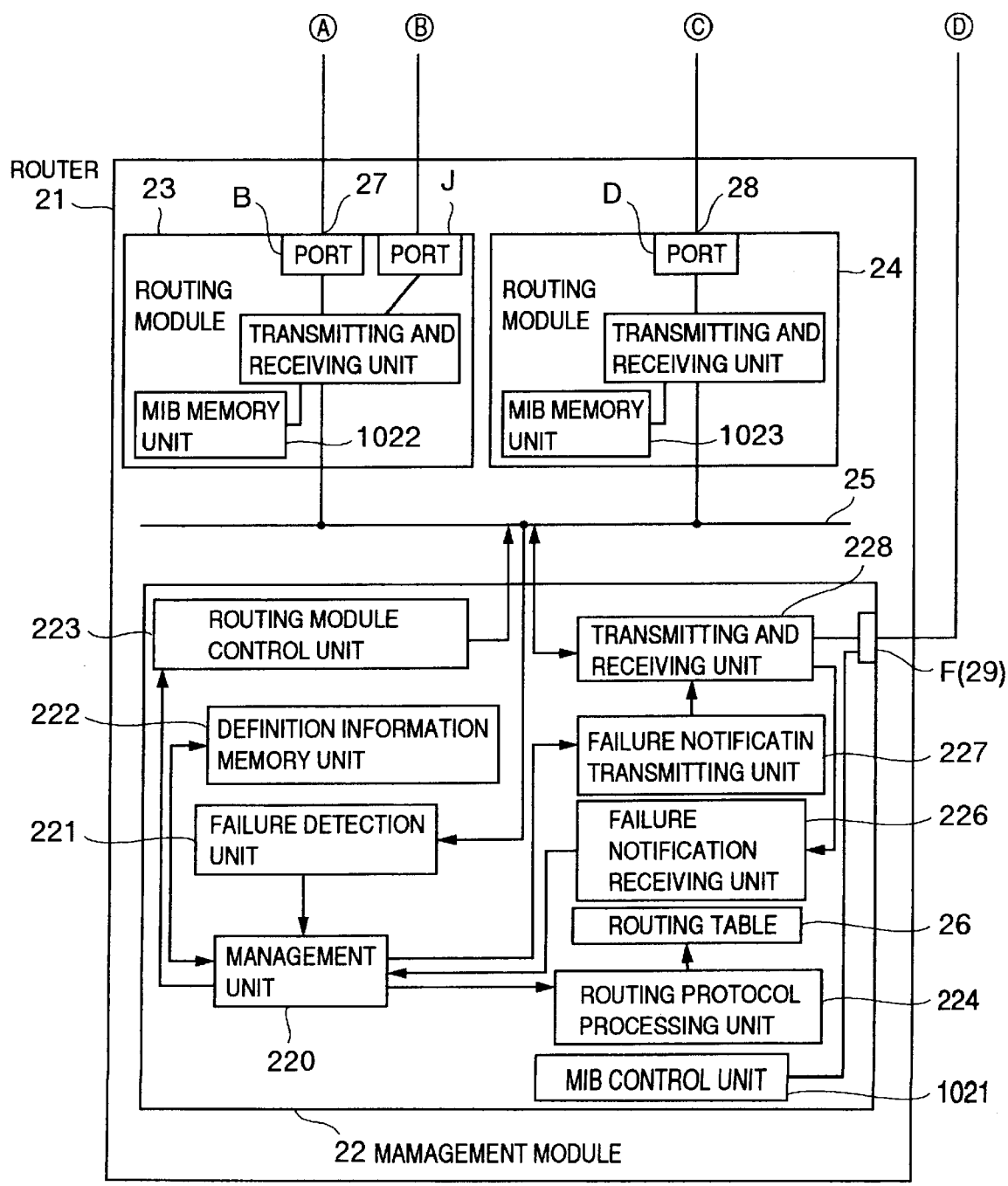

FIGS. 18A and 18B are block diagrams schematically illustrating a network system according to the fifth embodiment.

The embodiment can be applied to any of the first to fourth embodiments.

The management information is, for example, statistical information of a traffic of communication performed by using a certain port (for example, the number of transmitted packets, the number of received packets, the number of errors of the transmitted packets, the number of errors of the received packet and the like). The management information managed by management information base (MIB) is named MIB information.

Only different points of the configuration of FIGS. 18A and 18B from the configuration of FIGS. 1A and 1B are now described.

In the embodiment, there is provided at least one management terminal 1042, which may be connected to any of the networks N, M and P, while in the embodiment the management terminal is connected to the network N. The management terminal 1042 includes a port K connected to the network N (41). The management terminal 1042 has the function of requiring the MIB information to an MIB control unit of the management module. The management module 12 includes an MIB control unit 1011, which is connected to the transmitting and receiving unit 128. Similarly, the management module 21 includes an MIB control unit 1021, which is connected to the transmitting and receiving unit 228. The routing module 13 includes an MIB memory unit 1012 for storing MIB information relative to frames transmitted and received by the ports A and I for each of the ports A and I. Similarly, the routing module 14 includes an MIB memory unit 1013 for storing MIB information relative to frames transmitted and received by the port C. The routing module 23 includes an MIB memory unit 1022 for storing MIB information relative to frames transmitted and received by the ports B and J for each of the ports B and J. Similarly, the routing module 24 includes an MIB memory unit 1023 for storing MIB information relative to frames transmitted and received by the port D. The MIB memory units manage and store the MIB information for each address of the pertinent ports. Accordingly, for example, when the address of the port A is changed from x to a, the MIB memory unit 1012 manages MIB information stored when the address of the port A is x and MIB information stored when the address is a separately.

The MIB control unit 1011 has the function of collecting MIB information from the MIB memory units 1012 and 1013 through the router bus 15. Similarly, the MIB control unit 1021 has the function of collecting MIB information from the MIB memory units 1022 and 1023 through the router bus 25.

The MIB control units 1011 and 1021 can communicate with each other through the inter-apparatus communication bus 31. Further, the MIB control units 1011 and 1021 can transfer MIB information to the management terminal 1042 through the port.

Figure 19:
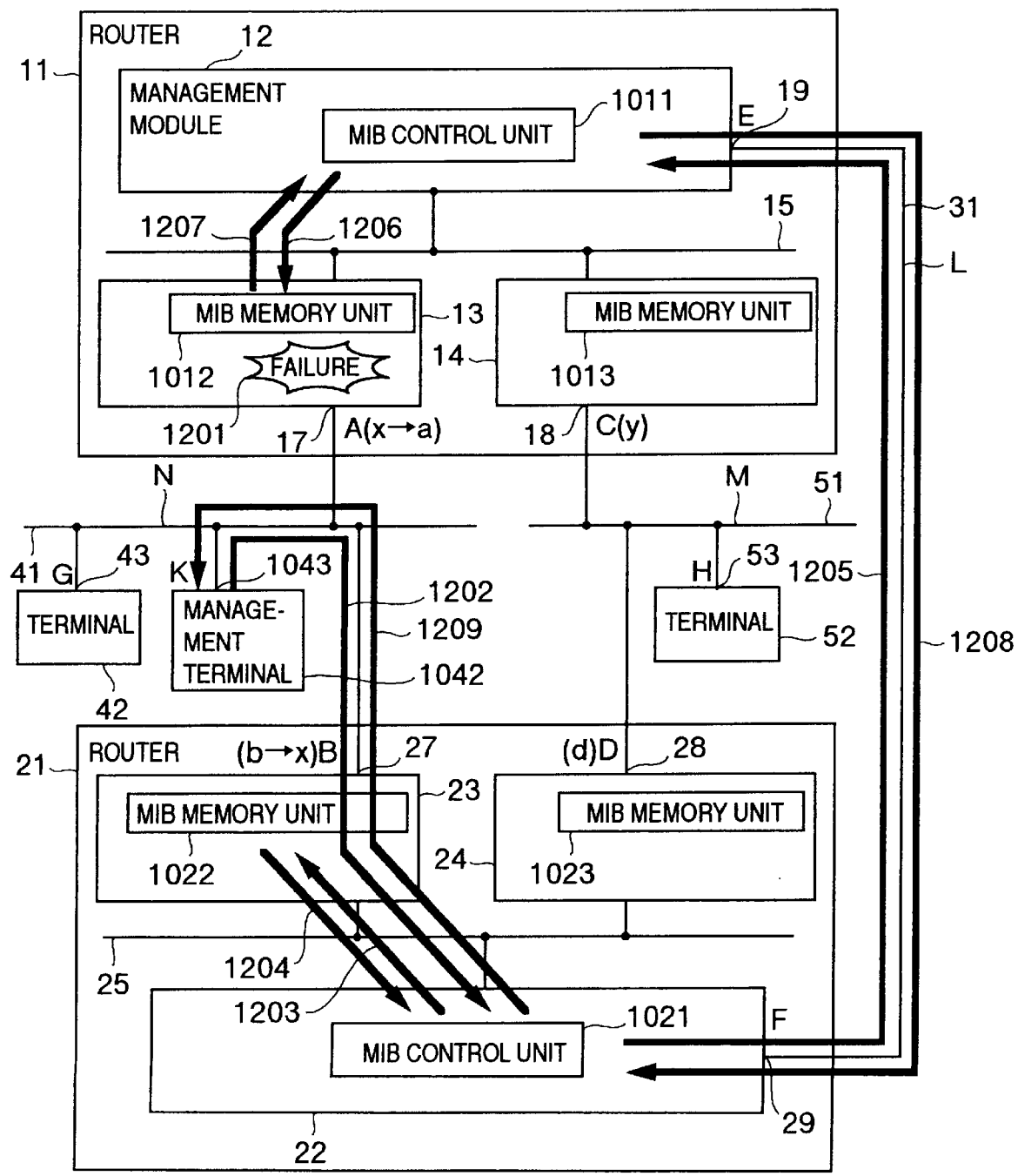
FIG. 19 shows a route for collecting MIB information when a failure occurs in a current port A in the fifth embodiment of the network system according to the present invention.

In the embodiment structured above, collection of MIB information when the network system is operated normally is now described with reference to FIGS. 18A, 18B and 19. In FIG. 19, the configuration of the management modules 12, 22 and the routing modules 13, 14, 23 and 24 is the same as in FIGS. 18A and 18B.

Description is made to the case where MIB information relative to the relay address x is collected, for example.

First, when the management terminal 1042 issues an MIB collection request for the relay address x, the MIB collection request is sent through the port A of the routing module 13, the transmitting and receiving unit 13a, the router bus 15 and the transmitting and receiving unit 128 to the MIB control unit 1011. The MIB control unit 1011 recognizes from the definition information memory unit 122 that the address x is corresponds to the port A and sends the MIB collection request to the MIB memory unit 1012 of the routing module 13 having the address x through the transmitting and receiving unit 128, the router bus 15 and the transmitting and receiving unit 13a. Further, the MIB control unit 1011 sends the MIB collection request for the address x through the transmitting and receiving unit 128 to the inter-apparatus communication bus 31. Further, in this case, only when the MIB control unit 1011 recognizes with reference to data 122A of the definition information memory unit 122 that the port A is the current system, the MIB control unit 1011 sends the MIB collection request through the transmitting and receiving unit 128 to the inter-apparatus communication bus 31.

The MIB memory unit 1012 reads out MIB information about the address x, that is, information (MIB information) relative to communication traffic for the address x of the port A in response to the MIB collection request for the address x and sends the information as an MIB response through the transmitting and receiving unit 13a, the router bus 25 and the transmitting and receiving unit 128 to the MIB control unit 1011.

On the other hand, the MIB collection request for the address x is sent through the transmitting and receiving unit 228 to the MIB control unit 1021 in the router 21. The MIB control unit 1021 recognizes from the definition information memory unit 222 that the address x is the relay address of the port B and sends the MIB collection request for the address x to the MIB memory unit 1022 of the routing module 23 through the transmitting and receiving unit 228, the router bus 25 and the transmitting and receiving unit 23a. The MIB information concerning the address x, that is, the MIB information relative to the communication traffic for the address x of the port B is read out from the MIB memory unit 1022 in response to the MIB collection request for the address x and is sent to the MIB control unit 1021 through the transmitting and receiving unit 23a, the router bus 25 and the transmitting and receiving unit 228 as the MIB response. The MIB control unit 1021 sends the MIB response through the transmitting and receiving unit 228, the inter-apparatus communication bus 31 and the transmitting and receiving unit 128 to the MIB control unit 1011.

Accordingly, the MIB control unit 1011 sums the MIB information for two MIB responses to obtain total MIB information for the address x or the network N, that is, the total communication traffic statistical information and sends this information as the total MIB information to the management terminal 1042 through the transmitting and receiving unit 128, the router bus 15, the transmitting and receiving unit 13a, the port A and the network N.

With this operation, the response to the MIB request for the relay address x from the management terminal 1042 can be returned to the management terminal 1042.

Further, similarly, the MIB request for the relay address y from the management terminal 1042 is collected by the MIB control unit 1011 and is returned to the management terminal.

Collection of MIB information relative to the relay address x when a failure occurs in a port of the router 11 of the current system, that is, the port A is now described with reference to FIGS. 18 and 19.

The process for restoring communication between the terminals 42 and 52 after occurrence of failure in the port A is the same as the process described with reference to FIGS. 5, 6A and 6B in the first embodiment and description thereof is omitted.

As described above, in the state where the communication between the terminals 42 and 52 has been restored and the failure restoration process of the port A has been performed, the IP address of the port A is change from the relay address x to the inherent address a and the IP address of the port B is changed from the inherent address b to the relay address x. The IP addresses of the ports C and D are the relay address y and the inherent address d as they are, respectively.

In such a state, the management terminal 1042 issues the MIB collection request 1202 for the relay address x of the port A where the failure occurs. The MIB collection request 1202 is sent through the port B of the routing module 23, the transmitting and receiving unit 23a, the router bus 25 and the transmitting and receiving unit 228 to the MIB control unit 1021. The MIB control unit 1021 recognizes from the definition information control unit 222 that the address x corresponds to the port B and sends the MIB collection request 1203 to the MIB memory unit 1022 of the routing module 23 having the address x through the transmitting and receiving unit 228, the router bus 25 and the transmitting and receiving unit 23a. Further, since the MIB control unit 1021 recognizes occurrence of failure in the address x of the router 11 from the failure notification S4 from the router 11, the MIB control unit 1021 sends the MIB collection request 1205 for the address x through the transmitting and receiving unit 228 to the inter-apparatus communication bus 31. Further, in this case, only when the MIB control unit 1021 recognizes that the port B is the current system with reference to the data 222B of the definition information memory unit 222, the MIB control unit 1021 sends the MIB collection request 1205 through the transmitting and receiving unit 228 to the inter-apparatus communication bus 31.

The MIB information for the address x, that is, information (MIB information) relative to the communication traffic of the port B after the port B has been changed from the address b to the address x is read out from the MIB memory unit 1022 in response to the MIB collection request for the address x and is sent as the MIB response 1204 through the transmitting and receiving unit 23a, the router bus 25 and the transmitting and receiving unit 228 to the MIB control unit 1021.

On the other hand, the MIB collection request for the address x is sent through the transmitting and receiving unit 128 to the MIB control unit 1011 in the router 11. The MIB control unit 1011 recognizes from the definition information memory unit 122 that the address x corresponds to the port A and sends the MIB collection request 1206 for the address x to the MIB memory unit 1012 of the routing module 13 through the transmitting and receiving unit 128, the router bus 15 and the transmitting and receiving unit 13a. The MIB information for the address x, that is, information (MIB information) relative to the communication traffic of the port A before the port A is changed from the address x to the address a is read out from the MIB memory unit 1012 in response to the MIB collection request 1206 for the address x and is sent as the MIB response 1207 to the MIB control unit 1011 through the transmitting and receiving unit 13a, the router bus 15 and the transmitting and receiving unit 128. The MIB control unit 1011 sends the MIB response 1207 through the transmitting and receiving unit 128, the inter-apparatus communication bus 31 and the transmitting and receiving unit 228 to the MIB control unit 1021.

Accordingly, the MIB control unit 1021 sums the MIB information for the MIB responses 1204 and 1207 to obtain total MIB information for the address x or the network N, that is, the total communication traffic statistical information and sends this information as the total MIB information 1109 to the management terminal 1042 through the transmitting and receiving unit 228, the router bus 25, the transmitting and receiving unit 23a, the port B and the network N.

With this operation, the response to the MIB request for the relay address x from the management terminal 1042 can be returned to the management terminal 1042.

More particularly, the apparatus of the embodiment collects the MIB of the relay address x by the following procedure:

(1) A failure 1201 occurs in the port A to thereby change the port A to the standby system and the port B to the current system.

(2) The management terminal 1042 issues the MIB collection request 1202 for the address x.

(3) The MIB control unit 1021 receives the MIB request 1202 through the ports K and B.

(4) The MIB request 1203 is issued to the routing module 23 having the relay address x in the router 21.

(5) The routing module 23 transfers the MIB response 1204 of the MIB memory unit 1022 to the MIB control unit 1021.

(6) The MIB control unit 1021 issues the MIB request 1205 to the MIB control unit 1011 of the other router 11.

(7) The MIB control unit 1011 issues the MIB request 1206 to the routing module 12 having the relay address x in its own router 11.

(8) The routing module 13 transfers the MIB response 1207 of the MIB memory unit 1012 to the MIB control unit 1011.

(9) The MIB control unit 1011 transfers the MIB response 1208 to the MIB control unit 1021.

(10) The MIB control unit 1021 calculates the total communication traffic statistical information of the relay address x on the basis of the MIB of the MIB memory units 1022 and 1012.

(11) The MIB control unit 1021 transfers the total communication traffic statistical information 1109 to the management terminal 1042.

As described above, by changing the IP port of the current port where failure occurs and the standby port of the router 21 when the failure occurs in the ports of the router 11, the communication route between the terminals connected to the networks can be restored.

As described above, according to the embodiment, even if a failure occurs in a port of the current system, operation of only the port where the failure occurs (or all ports included in the routing module of the port where the failure occurs) is stopped and operation of other normal ports of the current system is continued. Further, the port of the standby system corresponding to the port where the failure occurs is operated instead of the port where the failure occurs (or the port of which operation is stopped). Accordingly, past MIB information relative to the port of which operation is stopped of the current system can be obtained. Accordingly, management of the network based on the MIB information available before occurrence of the failure can be performed.

Further, since the address of the port where the failure occurs is used as the address of the port of the standby system operated instead, the management terminal 1042 can obtain the MIB information of the port of the current system of which operation is automatically stopped without changing the address of the source requiring the MIB information regardless of change of route.

Further, before occurrence of failure, the MIb collection request for the address x from the management terminal is received by the port A having the address x and the MIB control unit 1101 of the router 11 collects the MIB information of the MIB memory unit 1012. MIB information of the MIB memory unit 1022 of the corresponding router 21 is collected through the inter-apparatus communication bus 31 and is summed to obtain the total sum. The sum total is sent to the management terminal. In this case, since the router 21 is the standby system, the MIB information of the MIB memory unit 1022 is 0.

Figure 20:
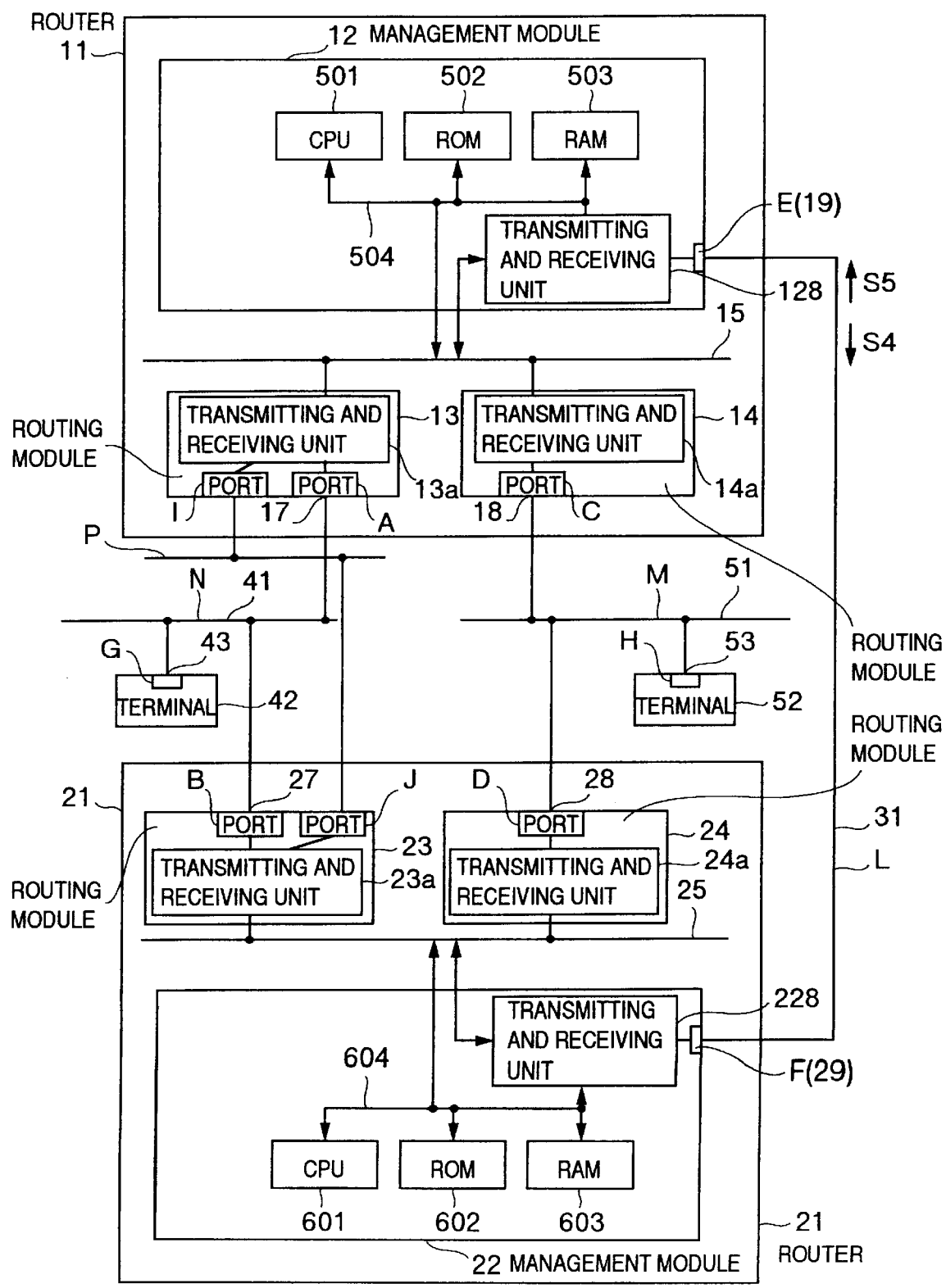
FIG. 20 is a block diagram schematically illustrating an example of a network system in case where management modules of each of the embodiments of the network system of the present invention are configured by computers.

In the embodiments, each block of the management modules 12 and 22 of the routers 11 and 21 may be structured by hardware but may be structured by software as follows. In other words, each of the management modules 12 and 22 may be structured by a computer as shown in FIG. 20. In FIG. 20, the management module 12 is constituted by a CPU 501, ROM 502, RAM 503, the transmitting and receiving unit 128 and a bus for connecting them, and similarly the management module 22 is constituted by a CPU 601, a ROM 602, a RAM 603, the transmitting and receiving unit 228 and a bus for connecting them. The transmitting and receiving units 128 and 228 is structured by hardware.

In the management module 12, the processes of the management unit 120, the failure detection unit 121, the routing control unit 123, the routing protocol processing unit 124, the failure notification receiving unit 126 and the failure notification transmitting unit 127 are executed by programs stored in the ROM 502. Further, the routing table 16 and the definition information memory unit 122 may be provided in the RAM 503. The same thing is also applied to the management module 22.

The processing procedure shown in the flow chart of FIG. 11 and the processing procedure of the fifth embodiment may be stored in each of the management modules 12 and 22 in the form of storage medium such as ROM, disk or the like. Further, the storage medium such as ROM, disk or the like in which the procedure shown in the flow chart of FIG. 11 and the processing procedure of the fifth embodiment are stored may be provided and a reproduction apparatus of the storage medium may be connected to any of the networks N, M and P of FIGS. 1A and 1B. The procedure stored in the storage medium may be reproduced and the reproduced procedure may be sent through the network to the routers 11 and 21 in which the procedure may be stored in the ROMs of the management modules 12 and 22.

In addition, in the embodiments, the inter-apparatus communication bus 31 constitutes a bus for connecting the management modules 12 and 22, while a route for connecting the routing module 13 (or 14) of the router 11 to the corresponding routing module 23 (or 24) of the router 22 through the corresponding network N (or M) may be used instead of the inter-apparatus communication bus 31.

In the embodiments, when the two networks are connected by the routers having the duplexed configuration of current and standby systems, communication is performed between the terminals connected to the respective networks. Further, it is needless to say that the present invention can be similarly applied to the communication between the terminals connected to the respective networks when one network is connected to the other network by a simple or duplexed routers.

Further, in the embodiments, as the internetwork apparatus for connecting between the networks, the router is used to connect between the networks by using the IP address at the network layer level, while it is not limited to the router and may be any internetwork apparatus for connecting between the networks. For example, it may be a bridge for connecting between the networks by using the MAC address at a level of the MAC layer which is a lower sub-layer of the data link layer or it may be a so-called brouter having both the functions of the router and the bridge.

Furthermore, the failure of the port has been described as failure of the internetwork apparatus, while it is needless to say that the present invention can be applied to failure of a portion connecting between the network and the internetwork apparatus.

As described above, according to the present invention, the reliable and inexpensive LAN system can be constructed by realization of duplication at a unit of port. Further, the terminal having neither dynamic routing function nor ARP function can communicate without considering change of a route. In addition, management of the network such as collection of statistical information and the like can be made without considering the redundant configuration.

What is claimed is:

1. A network system comprising:
    a plurality of networks;
    a first internetwork apparatus including a plurality of first ports each connected to said plurality of networks;
    a second internetwork apparatus including a plurality of second ports each connected to said plurality of networks; and
    data transmission means connected to said first and second internetwork apparatuses to transmit data mutually between said first and second internetwork apparatuses; wherein
    said first internetwork apparatus comprises:
        a first transmitting and receiving unit connected to said plurality of first ports and said data transmission means to transmit and receive data mutually among said plurality of first ports and said data transmission means;
        a failure detection unit for detecting whether a failure occurs in one of said plurality of first ports or a route between the one of said plurality of first ports and one of said plurality of networks connected thereto and, when occurrence of a failure is detected, issuing notification indicating a failure occurrence portion to transmit said notification through said first transmitting and receiving unit to said data transmission means; and
        a first port control unit for setting an IP address and a MAC address of each of said plurality of first ports to common addresses in a normal state and setting the IP address and the MAC address of said one of said plurality of first ports to inherent addresses in response to detection of occurrence of failure by said failure detection unit; and said second internetwork apparatus comprises:
        a second transmitting and receiving unit connected to said plurality of second ports and said data transmission means for transmitting and receiving data mutually among said plurality of second ports and said data transmission means and for receiving said notification transmitted through said data transmission means to produce said notification; and
        a second port control unit for setting an IP address and a MAC address of each of said plurality of second ports to inherent addresses in the normal state and responsive to said notification from said second transmitting and receiving unit to set the IP address and the MAC address of one of said plurality of second ports connected through said one of said plurality of networks to said one of said plurality of first ports to said common addresses of said one of said plurality of first sorts.

2. A network system according to claim 1, wherein
    said first port control unit sets the IP address and the MAC address of each of said plurality of first ports to common addresses common to a corresponding one of said plurality of second ports connected through a corresponding one of said plurality of networks in the normal state, said common addresses being different for each of said plurality of first ports, and
    said second port control unit sets the IP address and the MAC address of each of said plurality of second ports to addresses inherent thereto in the normal state.

3. A network system according to claim 2, wherein
    said first port control unit includes means for disconnecting said one of said plurality of first ports from said one of said plurality of networks in response to detection of occurrence of failure by said failure detection unit, and
    said second port control unit changes the IP address and the MAC address of said one of said plurality of second ports from said inherent addresses to said common addresses set in said one of said plurality of first ports in response to said notification from said second transmitting and receiving unit.

4. A network system according to claim 3, wherein
    said first port control unit sets the IP address and the MAC address of said one of said plurality of first ports to inherent addresses of said port when said one of said plurality of first ports is restored from failure after said one of said plurality of first ports has been disconnected from said one of said plurality of networks, so that said one of said plurality of first ports can transmit data to said one of said plurality of networks after restoration of failure.

5. A network system according to claim 1, further comprising:
    a management terminal connected to said one of said plurality of networks for managing management information base (MIB) information of each of said plurality of first and second ports;
    wherein
    said first internetwork apparatus further comprises:
        a first MIB information memory unit for storing said management information base information for each of said plurality of first ports; and
        a first MIB information control unit connected to said first MIB information memory unit and said first transmitting and receiving unit; and
    said second internetwork apparatus further comprises:
        a second MIB information memory unit for storing MIB information for each of said plurality of second ports; and a second MIB information control unit connected to said second MIB information memory unit and said second transmitting and receiving unit;

said management terminal sending a collection request of management information base information of said one of said plurality of first ports through said one of said plurality of networks, said one of said plurality of second ports and said second transmitting and receiving unit to said second MIB information control unit after said one of said plurality of second ports has been caused to be able to transmit and receive data to and from said one of said plurality of networks;

said second MIB information control unit being responsive to said collection request of said management information base information from said management terminal to read out management information base information from said second MIB information memory unit after said one of said plurality of second ports has been caused to be able to transmit and receive data, and sending a collection request of management information base information available before occurrence of failure of said one of said plurality of first ports through said second transmitting and receiving unit, said data transmission means and said first transmitting and receiving unit to said first MIB information control unit;

said first MIB information control unit being responsive to said collection request of management information base information from said second MIB information control unit to read out management information base information available before occurrence of failure of said one of said plurality of first ports from said first MIB information memory unit and transmitting said management information base information through said first transmitting and receiving unit, said data transmission means and said second transmitting and receiving unit to said second MIB information control unit;

said second MIB information control unit calculating a sum total of management information base information read out from said first and second MIB information memory units to send said sum total through said second transmitting and receiving unit, said one of said plurality of second ports and said one of said plurality of networks to said management terminal.

6. A network system comprising:

a plurality of networks;

a first internetwork apparatus including a plurality of first ports each connected to said plurality of networks;

a second internetwork apparatus including a plurality of second ports each connected to said plurality of networks; and data transmission means connected to said first and second internetwork apparatuses to transmit data mutually between said first and second internetwork apparatuses;

wherein said first internetwork apparatus comprises:

a first transmitting and receiving unit connected to said plurality of first ports and said data transmission means to transmit and receive data mutually among said plurality of first ports and said data transmission means;

a failure detection unit for detecting whether a failure occurs in any of one of said plurality of first ports and a route between one of said plurality of first ports and one of said plurality of networks connected thereto and, when occurrence of a failure is detected, issuing notification indicating a failure occurrence portion to transmit said notification through said first transmitting and receiving unit to said data transmission means; and a first port control unit for setting an IP address and a MAC address of each of said plurality of first ports to common addresses in a normal state and setting the IP address and the MAC address of said one of said plurality of first ports to inherent addresses in response to detection of occurrence of failure by said failure detection unit; and said second internetwork apparatus comprises:

a second transmitting and receiving unit connected to said plurality of second ports and said data transmission means for transmitting and receiving data mutually among said plurality of second ports and said data transmission means and for receiving said notification transmitted through said data transmission means to produce said notification; and a second port control unit for setting an IP address and a MAC address of each of said plurality of second ports to inherent addresses in the normal state and responsive to said notification from said second transmitting and receiving unit to set the IP address and the MAC address of one of said plurality of second ports connected through said one of said plurality of networks to said one of said plurality of first ports to said common addresses of said one of said plurality of first sorts.

7. A network system according to claim 6, wherein said first port control unit sets the IP address and the MAC address of each of said plurality of first ports to common addresses common to a corresponding one of said plurality of second ports connected through a corresponding one of said plurality of networks in the normal state, said common addresses being different for each of said plurality of first ports.

8. A network system according to claim 7, wherein said first port control unit includes means for disconnecting said one of said plurality of first ports from said one of said plurality of networks in response to detection of occurrence of failure by said failure detection unit, and said second port control unit changes the IP address and the MAC address of said one of said plurality of second ports to said common addresses set in said one of said plurality of first ports in response to said notification from said second transmitting and receiving unit.

9. A network system according to claim 8, wherein said first port control unit deletes the IP address and the MAC address of said one of said plurality of first ports when said one of said plurality of first ports is restored from failure after said one of said plurality of first ports has been disconnected from said one of said plurality of networks.

10. A network system according to claim 6, further comprising:

a management terminal connected to said one of said plurality of networks for managing management information base (MIB) information of each of said plurality of first and second ports;

wherein said first internetwork apparatus further comprises:

a first MIB information memory unit for storing MIB information for each of said plurality of first ports; and a first MIB information control unit connected to said first MIB information memory unit and said first transmitting and receiving unit; and said second internetwork apparatus further comprises:
a second MIB information memory unit for storing MIB information for each of said plurality of second ports; and
a second MIB information control unit connected to said second MIB information memory unit and said second transmitting and receiving unit;

said management terminal sending a collection request of management information base information of said one of said plurality of first ports through said one of said plurality of networks, said one of said plurality of second ports and said second transmitting and receiving unit to said second MIB information control unit after said one of said plurality of second ports has been caused to be able to transmit and receive data to and from said one of said plurality of networks;

said second MIB information control unit being responsive to said collection request of MIB information from said management terminal to read out management information base information from said second MIB information memory unit after said one of said plurality of second ports has been caused to be able to transmit and receive data, and sending a collection request of management information base information available before occurrence of failure of said one of said plurality of first ports through said second transmitting and receiving unit, said data transmission means and said first transmitting and receiving unit to said first MIB information control unit;

said first MIB information control unit being responsive to said collection request of management information base information from said second MIB information control unit to read out management information base information available before occurrence of failure of said one of said plurality of first ports from said first MIB information memory unit and transmitting said management information base information through said first transmitting and receiving unit, said data transmission means and said second transmitting and receiving unit to said second MIB information control unit;

said second MIB information control unit calculating a sum total of management information base information read out from said first and second MIB information memory units to send said sum total through said second transmitting and receiving unit, said one of said plurality of second ports and said one of said plurality of networks to said management terminal.

11. A failure restoration method in a network system including a plurality of networks, a first internetwork apparatus having a plurality of first ports each connected to said plurality of networks, a second internetwork apparatus having a plurality of second ports each connected to said plurality of networks, and data transmission means connected to said first and second internetwork apparatuses to transmit data mutually between said first and second internetwork apparatuses, data being transmitted and received mutually among said plurality of first ports and said data transmission means and among said plurality of second ports and said data transmission means, comprising the steps of:
setting an IP address and a MAC address of each of said plurality of first ports to common addresses in a normal state;
setting an IP address and a MAC address of said plurality of second ports to inherent addresses in the normal state;
detecting whether a failure occurs in any of one of said plurality of first ports and a route between one of said plurality of first ports and one of said plurality of networks connected thereto;
setting the IP address and the MAC address of said one of said plurality of first ports to inherent addresses in response to said detection of occurrence of failure; and
setting the IP address and the MAC address of one of said plurality of second ports connected to said one of said plurality of first ports through said one of said plurality of networks to said common addresses of said one of said plurality of first ports in response to said detection of occurrence of failure.

12. A failure restoration method in a network system including a plurality of networks, a first internetwork apparatus having a plurality of first ports each connected to said plurality of networks, a second internetwork apparatus having a plurality of second ports each connected to said plurality of networks, and data transmission means connected to said first and second internetwork apparatuses to transmit data mutually between said first and second internetwork apparatuses, data being transmitted and received mutually among said plurality of first ports and said data transmission means and among said plurality of second ports and said data transmission means, comprising the steps of:
setting an IP address and a MAC address of each of said plurality of first ports to common addresses in a normal state;
setting an IP address and a MAC address of said plurality of second ports to inherent addresses in the normal state;
detecting whether a failure occurs in any of one of said plurality of first ports and a route between one of said plurality of first ports and one of said plurality of networks connected thereto;
setting the IP address and the MAC address of said one of said plurality of first ports to inherent addresses in response to said detection of occurrence of failure; and
setting the IP address and the MAC address of one of said plurality of second ports connected to said one of said plurality of first ports through said one of said plurality of networks to said common addresses of said one of said plurality of first ports in response to said detection of occurrence of failure.

13. A computer program embodied on a computer readable medium for use in a network system including a plurality of networks, a first internetwork apparatus having a plurality of first ports each connected to said plurality of networks, a second internetwork apparatus having a plurality of second ports each connected to said plurality of networks, and data transmission means connected to said first and second internetwork apparatuses to transmit data mutually between said first and second internetwork apparatuses, data being transmitted and received mutually among said plurality of first ports and said data transmission means and among said plurality of second ports and said data transmission means, comprising:
program code means for setting an IP address and a MAC address of each of said plurality of first ports to common addresses in a normal state;
program code means for setting an IP address and a MAC address of said plurality of second ports to inherent addresses in the normal state;

program code means for detecting whether a failure occurs in any of one of said plurality of first ports and a route between one of said plurality of first ports and one of said plurality of networks connected thereto;

program code means for setting the IP address and the MAC address of said one of said plurality of first ports to inherent addresses in response to said detection of occurrence of failure; and program code means for setting the IP address and the MAC address of one of said plurality of second ports connected to said one of said plurality of first ports through said one of said plurality of networks to said common addresses of said one of said plurality of first ports in response to said detection of occurrence of failure.

14. A computer program embodied on a computer readable medium for use in a network system including a plurality of networks, a first internetwork apparatus having a plurality of first ports each connected to said plurality of networks, a second internetwork apparatus having a plurality of second ports each connected to said plurality of networks, and data transmission means connected to said first and second internetwork apparatuses to transmit data mutually between said first and second internetwork apparatuses, data being transmitted and received mutually among said plurality of first ports and said data transmission means and among said plurality of second ports and said data transmission means, comprising:

program code means for setting an IP address and a MAC address of each of said plurality of first ports to common addresses in a normal state;

program code means for setting an IP address and a MAC address of said plurality of second ports to inherent addresses in the normal state;

program code means for detecting whether a failure occurs in any of one of said plurality of first ports and a route between one of said plurality of first ports and one of said plurality of networks connected thereto;

program code means for setting the IP address and the MAC address of said one of said plurality of first ports to inherent addresses in response to said detection of occurrence of failure; and program code means for setting the IP address and the MAC address of one of said plurality of second ports connected to said one of said plurality of first ports through said one of said plurality of networks to said common addresses of said one of said plurality of first ports in response to said detection of occurrence of failure.

15. A network system comprising:

a plurality of networks;

a first internetwork apparatus including a plurality of first ports each connected to said plurality of networks;

a second internetwork apparatus including a plurality of second ports each connected to said plurality of networks;

data transmission means connected to said first and second internetwork apparatuses to transmit data mutually between said first and second internetwork apparatuses; and a management terminal connected to any one of said plurality of networks for managing management information base (MIB) information of each of said plurality of first and second ports;

wherein said first internetwork apparatus comprises:

a first transmitting and receiving unit connected to said plurality of first ports and said data transmission means to transmit and receive data mutually among said plurality of first ports and said data transmission means;

a failure detection unit for detecting whether a failure occurs in any of one of said plurality of first ports and a route between one of said plurality of first ports and one of said plurality of networks connected thereto and, when occurrence of a failure is detected, issuing notification indicating a failure occurrence portion to transmit said notification through said first transmitting and receiving unit to said data transmission means;

a first port control unit for causing each of said plurality of first ports to be able to transmit and receive data to and from said one of said plurality of networks in a normal state and causing said one of said plurality of first ports not to be able to transmit and receive data to and from said one of said plurality of networks in response to detection of occurrence of failure by said failure detection unit, said first port control unit setting an address of each of said plurality of first ports to a common address common to said port and a corresponding one of said plurality of second ports connected through a corresponding one of said plurality of networks in the normal state, said common address being different for each of said plurality of first ports;

a first MIB information memory unit for storing MIB information for each of said plurality of first ports; and a first MIB information control unit connected to said first MIB information memory unit and said first transmitting and receiving unit; and said second internetwork apparatus comprises:

a second transmitting and receiving unit connected to said plurality of second ports and said data transmission means for transmitting and receiving data mutually among said plurality of second ports and said data transmission means and for receiving said notification transmitted through said data transmission means to produce said notification;

a second port control unit for causing said plurality of second ports not to be able to receive data from said plurality of networks and to be able to transmit data to said plurality of networks in the normal state and responsive to said notification from said second transmitting and receiving unit to cause one of said plurality of second ports connected through said one of said plurality of networks to said one of said plurality of first ports to be able to transmit and receive data to and from said one of said plurality of networks, said second port control unit setting an address of each of said plurality of second ports to an address inherent to said port in the normal state;

a second MIB information memory unit for storing MIB information for each of said plurality of second ports; and a second MIB information control unit connected to said second MIB information memory unit and said second transmitting and receiving unit;

said management terminal issuing a collection request of management information base information to one of said common addresses;

one of said plurality of first ports including said one of said common addresses receiving collection request of management information base information from said management terminal and sending the received collection request to said first MIB information control unit;

said first MIB information control unit being responsive to collection request of management information base information from said management terminal to read out management information base information corresponding to said one of said common addresses from said first MIB information memory and sending a collection request of management information base information for one of said plurality of second ports including said one of said common address through said first transmitting and receiving unit, said data transmission means and said second transmitting and receiving unit to said second MIB information control unit;

said second MIB information control unit being responsive to said collection request of management information base information from said first MIB information control unit to read out management information base information corresponding to said one of said common addresses from said second MIB information memory unit and sending the management information base information through said second transmitting and receiving unit, said data transmission means and said first transmitting and receiving unit to said first MIB information control unit;

said first MIB information control unit calculating a sum total of the management information base information read out from said first and second MIB information memory units to send the sum total through said first transmitting and receiving unit and said one of said plurality of first ports including said one of said common addresses to said management terminal.

16. A network system comprising:

a plurality of networks;

a first internetwork apparatus including a plurality of first ports each connected to said plurality of networks;

a second internetwork apparatus including a plurality of second ports each connected to said plurality of networks;

data transmission means connected to said first and second internetwork apparatuses to transmit data mutually between said first and second internetwork apparatuses; and a management terminal connected to any one of said plurality of networks for managing management information base (MIB) information of each of said plurality of first and second ports;

wherein said first internetwork apparatus comprises:
  a first transmitting and receiving unit connected to said plurality of first ports and said data transmission means to transmit and receive data mutually among said plurality of first ports and said data transmission means;
  a failure detection unit for detecting whether a failure occurs in any of one of said plurality of first ports and a route between one of said plurality of first ports and one of said plurality of networks connected thereto and, when occurrence of a failure is detected, issuing notification indicating a failure occurrence portion to transmit said notification through said first transmitting and receiving unit to said data transmission means;
  a first port control unit for causing each of said plurality of first ports to be able to transmit and receive data to and from said one of said plurality of networks in a normal state and causing said one of said plurality of first ports not to be able to transmit and receive data to and from said one of said plurality of networks in response to detection of occurrence of failure by said failure detection unit, said first port control unit setting an address of each of said plurality of first ports to a common address common to said port and a corresponding one of said plurality of second ports connected through a corresponding one of said plurality of networks in the normal state, said common address being different for each of said plurality of first ports;
  a first MIB information memory unit for storing MIB information for each of said plurality of first ports; and
  a first MIB information control unit connected to said first MIB information memory unit and said first transmitting and receiving unit; and said second internetwork apparatus comprises:
  a second transmitting and receiving unit connected to said plurality of second ports and said data transmission means for transmitting and receiving data mutually among said plurality of second ports and said data transmission means and for receiving said notification transmitted through said data transmission means to produce said notification;
  a second port control unit for causing each of said plurality of second ports not to be able to transmit and receive data to and from one of said plurality of networks in the normal state and responsive to said notification from said second transmitting and receiving unit to cause one of said plurality of second ports connected through said one of said plurality of networks to said one of said plurality of first ports to be able to transmit and receive data to and from said one of said plurality of networks, said second port control unit not setting an address of each of said plurality of second ports in the normal state;
  a second MIB information memory unit for storing MIB information for each of said plurality of second ports; and
  a second MIB information control unit connected to said second MIB information memory unit and said second transmitting and receiving unit;

said management terminal issuing a collection request of management information base information to one of said common addresses;

one of said plurality of first ports including said one of said common addresses receiving the collection request of the management information base information from said management terminal and sending the received collection request to said first MIB information control unit;

said first MIB information control unit being responsive to the collection request of the management information base information from said management terminal to read out management information base information corresponding to said one of said common addresses from said first MIB information memory unit and sending a collection request of management information base information for one of said plurality of second ports including said one of said common address through said first transmitting and receiving unit, said data transmission means and said second transmitting and receiving unit to said second MIB information control unit;

said second MIB information control unit being responsive to the collection request of the management information base information from said first MIB information control unit to read out management information base information corresponding to said one of said common addresses and sending the management information base information through said second transmitting and receiving unit, said data transmission means and said first transmitting and receiving unit to said first MIB information control unit;

said first MIB information control unit calculating a sum total of the management information base information read out from said first and second MIB information memory units to send the sum total through said first transmitting and receiving unit and said one of said plurality of first ports including said one of said common addresses to said management terminal.

* * * * *